United States Patent
Lee et al.

(10) Patent No.: US 11,101,489 B2
(45) Date of Patent: Aug. 24, 2021

(54) APPARATUS AND METHOD FOR MANUFACTURING ELECTRODE ASSEMBLY AND ELECTRODE ASSEMBLY MANUFACTURED USING THE SAME

(71) Applicant: NS CO., LTD., Cheongju-si (KR)

(72) Inventors: See Yong Lee, Cheongju-si (KR); Han Woong Lee, Cheongju-si (KR); Sung Jin Jun, Cheongju-si (KR)

(73) Assignee: NS CO.LTD., Cheongju-si ( * ) Notice: Subject to any disclaimer, the term of this patent is extended or adjusted under 35 U.S.C. 154(b) by 75 days.

(21) Appl. No.: 16/088,160

(22) PCT Filed: Sep. 19, 2016

(86) PCT No.: PCT/KR2016/010399
§ 371 (c)(1),
(2) Date: Sep. 25, 2018

(87) PCT Pub. No.: WO2017/171160
PCT Pub. Date: Oct. 5, 2017

(65) Prior Publication Data
US 2020/0127317 A1    Apr. 23, 2020

(30) Foreign Application Priority Data

Apr. 1, 2016  (KR) .......................... 10-2016-0040466
Apr. 4, 2016  (KR) .......................... 10-2016-0041212
(Continued)

(51) Int. Cl.
*H01M 10/04* (2006.01)

(52) U.S. Cl.
CPC ... *H01M 10/0404* (2013.01); *H01M 10/0409* (2013.01); *H01M 10/0459* (2013.01)

(58) Field of Classification Search
CPC ......... H01M 10/0404; H01M 10/0409; H01M 10/0459
(Continued)

(56) References Cited

U.S. PATENT DOCUMENTS 6,709,785 B2    3/2004  Lee et al.
2010/0319187 A1  12/2010  Kim et al.
(Continued)

FOREIGN PATENT DOCUMENTS

EP    2 569 816    3/2013
EP    2 856 552    4/2015
(Continued)

OTHER PUBLICATIONS

European Search Report for PCT/KR2016/010399, dated Jan. 23, 2019.
(Continued)

*Primary Examiner* — James M Erwin

(57) ABSTRACT

The present invention relates to an apparatus for manufacturing an electrode assembly including a separator feeding unit including a first roll on which one side of a separator strip is wound and a second roll on which the other side of the separator strip is wound, wherein the first and second rolls respectively unwind the separator strip so that the separator strip is fed toward a core portion of the separator strip disposed between the first and second rolls; a separator folding unit for winding the separator strip around the core portion to form a separator spiral folded in a spiral shape about the core portion; a first electrode lamination unit for laminating first electrode members on one surface of the separator spiral; and a second electrode lamination unit for laminating second electrode members on the other surface of the separator spiral.

18 Claims, 27 Drawing Sheets

(30) Foreign Application Priority Data

Jul. 29, 2016 (KR) ........................ 10-2016-0097312
Jul. 29, 2016 (KR) ........................ 10-2016-0097313

(58) Field of Classification Search
USPC ............................................................ 29/730
See application file for complete search history.

(56) References Cited

U.S. PATENT DOCUMENTS

| | | | |
|---|---|---|---|
| 2013/0133184 A1 | 5/2013 | Bacci et al. | |
| 2013/0251495 A1 | 9/2013 | Hohenthanner et al. | |
| 2015/0024245 A1* | 1/2015 | Kwon | H01M 4/13 429/94 |

FOREIGN PATENT DOCUMENTS

| | | |
|---|---|---|
| EP | 2 869 387 | 5/2015 |
| EP | 2 149 927 | 2/2021 |
| JP | 2003-523059 | 7/2003 |
| JP | 2005-190777 | 7/2005 |
| JP | 2011-3518 | 1/2011 |
| JP | 2012-174389 | 9/2012 |
| JP | 2013-543240 | 11/2013 |
| KR | 10-2004-0079537 | 9/2004 |
| KR | 10-2010-0137290 | 12/2010 |
| KR | 10-1299484 B1 | 8/2013 |
| KR | 10-1365718 B1 | 2/2014 |
| KR | 10-2014-0042328 | 4/2014 |

OTHER PUBLICATIONS

European Search Report for EP 19180774.2-1108, dated Oct. 14, 2019.
Office Action for Japanese Patent Application No. 2018-551845, dated Sep. 24, 2019.
Office Action for Japanese Patent Application No. 2019-113675, dated Apr. 7, 2020.

* cited by examiner

APPARATUS AND METHOD FOR MANUFACTURING ELECTRODE ASSEMBLY AND ELECTRODE ASSEMBLY MANUFACTURED USING THE SAME

TECHNICAL FIELD

The present invention relates to an apparatus and a method for manufacturing an electrode assembly and an electrode assembly manufactured using the apparatus and method, and according to the present invention, the electrode assembly is manufactured by laminating electrodes and a separator.

This application claims priority to Korean Patent Application No. 10-2016-0040466, filed on Apr. 1, 2016, Korean Patent Application No. 10-2016-0041212, filed on Apr. 4, 2016, Korean Patent Application No. 10-2016-0097312, filed on Jul. 29, 2016, and Korean Patent Application No. 10-2016-0097313, filed on Jul. 29, 2016, in the Korean Intellectual Property Office, the disclosures of each of which are incorporated herein by reference.

BACKGROUND ART

In general, a secondary battery can be repeatedly used through a discharging process of converting chemical energy into electrical energy and a charging process opposite thereto. Examples of secondary batteries include nickel-cadmium (Ni—Cd) batteries, nickel-hydrogen (Ni—MH) batteries, lithium-metal batteries, lithium-ion (Li-ion) batteries, lithium-ion polymer batteries (Li-ion polymer batteries, hereinafter referred to as "LIPB"), and the like.

A secondary battery is composed of a positive electrode, a negative electrode, an electrolyte, and a separator, and stores and generates electricity using voltage difference between different positive electrode and negative electrode materials. Regarding generation of electricity, discharging is to move electrons from a negative electrode having a high voltage to a positive electrode having a low voltage (electricity is generated in proportion to voltage difference between the two electrodes), and charging is to move the electrons back from the positive electrode to the negative electrode. At this time, the positive electrode material receives electrons and lithium ions and returns to the metal oxide, which is the original form of the positive electrode material. That is, when a secondary battery is charged, charging current flows as metal atoms move from a positive electrode to a negative electrode through a separator, and when the secondary battery is discharged, discharging current flows as the metal atoms move from the negative electrode to the positive electrode.

Secondary batteries are attracting attention as energy sources in industries such as information technology (IT), automobiles, and energy storage. Specifically, in the IT field, there is demand for a secondary battery capable of continuous operation for a long time and a miniaturized and lightweight secondary battery. In the automobile field, a secondary battery having high output, durability, and stability to eliminate explosion risk is required. In the field of energy storage for storing surplus electric power produced using wind power, sunlight, or the like, a fixed secondary battery is used, so that a secondary battery satisfying somewhat relaxed conditions may be applied.

Among secondary batteries, research and development of lithium secondary batteries began in the early 1970s, and in 1990, a lithium ion battery using carbon as a negative electrode instead of lithium was developed and commercialized. Lithium secondary batteries having a cycle lifespan of 500 times or more and a short charging time of 1 to 2 hours show the highest sales growth rate among secondary batteries and are lighter than nickel-hydrogen batteries by about 30 to 40%, so the lithium secondary batteries may meet the demand for lightweighting. In addition, lithium secondary batteries have the highest voltage per unit cell (3.0 to 3.7 V) among existing secondary batteries and have excellent energy density. Therefore, lithium secondary batteries have characteristics optimized for mobile devices.

Lithium secondary batteries are generally classified into liquid electrolyte batteries and polymer electrolyte batteries depending on the types of electrolytes. Specifically, batteries using a liquid electrolyte are called lithium ion batteries, and batteries using a polymer electrolyte are called lithium polymer batteries. In addition, battery casings for a lithium secondary battery can be formed in various forms, and representative examples thereof include a cylindrical shape, a prismatic shape, and a pouch shape.

Inside the casing of a lithium secondary battery, an electrode assembly including a positive electrode, a negative electrode, and a separator interposed between the positive and negative electrodes is provided. In this case, the types of the electrode assemblies are classified into a jelly-roll type (winding type), a stack type (laminated type), and the like depending on structures thereof.

In recent years, to solve the problems of jelly-roll type electrode assemblies and stack type electrode assemblies, stack/folding type electrode assemblies in which full cells having a structure of positive electrode/separator/negative electrode or bicells having a structure of positive electrode/(negative electrode)/separator/negative electrode(positive electrode)/separator/positive electrode(negative electrode) having certain unit sizes are laminated using a continuously long separator strip have been developed.

In the conventional method of manufacturing the stack/folding type electrode assembly, rules for arranging full cells or bicells in a separator strip are complicated. In addition, the process of winding a separator strip is performed in a state wherein all full cells or bicells included in an electrode assembly are already arranged in the separator strip, such that the process of winding the separator strip is very difficult. Therefore, the conventional method of manufacturing the stack/folding type electrode assembly takes a long time due to difficulty in automation, resulting in a problem of deteriorated productivity. In addition, when the conventional method of manufacturing the stack/folding type electrode assembly is used, carelessness or errors are easily caused during the manufacturing process, thereby degrading the performance of an electrode assembly and a secondary battery manufactured using the same.

DISCLOSURE

Technical Problem

Therefore, the present invention has been made in view of the above problems, and it is one object of the present invention to provide an apparatus and method for manufacturing an electrode assembly having an improved structure that allows for automation and simplification of the manufacturing process and an electrode assembly manufactured using the apparatus and method.

Technical Solution

In accordance with one aspect of the present invention, provided is an apparatus for manufacturing an electrode assembly including a separator feeding unit including a first roll on which one side of a separator strip is wound and a second roll on which the other side of the separator strip is wound, wherein the first and second rolls respectively unwind the separator strip so that the separator strip is fed toward a core portion of the separator strip disposed between the first and second rolls; a separator folding unit for winding the separator strip around the core portion to form a separator spiral folded in a spiral shape about the core portion and including at least the core portion; a first electrode lamination unit for laminating first electrode members on one surface of the separator spiral; and a second electrode lamination unit for laminating second electrode members on the other surface of the separator spiral, wherein each time the first and second electrode members are newly laminated on the separator spiral, the separator folding unit winds the separator strip and rotates the core portion in a predetermined direction so that newly laminated first and second electrode members are covered with the separator strip, and as a result, the first and second electrode members are interposed between two neighboring layers of the separator spiral to form an electrode assembly.

In accordance with another aspect of the present invention, provided is a method of manufacturing an electrode assembly including step (a), in which a separator strip elongated in a strip shape is wound around a core portion provided between one side and the other side of the separator strip so that the separator strip is folded in a spiral shape, and as a result, the number of the spiral layers having the core portion as a minimum unit is increased stepwise to form a separator spiral, and at the same time, first and second electrode members are alternately interposed between two neighboring layers of the separator spiral to construct an electrode assembly, wherein step (a) includes step (a1) of laminating the first electrode members on one surface of the separator spiral and laminating the second electrode members on the other surface of the separator spiral; and step (a2), in which the separator strip is wound around the core portion so as to be folded in a spiral shape, and as a result, the laminated first and second electrode members in step (a1) are covered with the newly wound separator strip on the separator spiral, wherein steps (a1) and (a2) are repeatedly performed until the first and second electrode members are laminated in a predetermined number, respectively.

In accordance with yet another aspect of the present invention, provided is an electrode assembly including a separator spiral including a core portion, a first spiral part having one end connected to one end of the core portion and folded in a spiral shape about the core portion, and a second spiral part having one end connected to the other end of the core portion opposite to the one end of the core portion and folded in a spiral shape about the core portion; and at least one first electrode member and at least one second electrode member that have opposite polarities and that are alternately interposed between two neighboring layers of the separator spiral so as to be spaced apart from each other by the separator spiral.

Advantageous Effects

As apparent from the foregoing, the present invention advantageously provides an apparatus and method for manufacturing an electrode assembly and an electrode assembly manufactured using the apparatus and method.

First, according to the present invention, winding and folding of a separator strip can be performed at a fixed position corresponding to the core portion of the separator strip. Therefore, compared to a conventional method of manufacturing a stack/folding type electrode assembly, in which a separator strip on which all electrode members included in an electrode assembly are arranged in advance at predetermined gaps is sequentially rolled from one end of the separator strip to the other end thereof, when the apparatus of the present invention is used, the manufacturing time of an electrode assembly can be reduced, and the manufacturing process of an electrode assembly can be easily automated. In addition, quality deterioration of an electrode assembly or a secondary battery manufactured using the same due to carelessness or errors easily caused during the manufacturing process can be effectively prevented.

Second, according to the present invention, an electrode assembly can be manufactured by simultaneously winding a separator strip fed from both directions around a core portion, thereby further reducing the manufacturing time of the electrode assembly.

BEST MODE

Terms or words used herein shall not be limited to common or dictionary meanings, and have meanings corresponding to technical aspects of the embodiments of the present invention so as to most suitably express the embodiments of the present invention. Accordingly, the constructions of examples and drawings disclosed in the present specification are merely preferred embodiments of the present invention and do not represent the full technical spirit of the present invention. Therefore, it should be understood that various equivalents and modifications may have been present at a filling time of the present application.

Elements in the following drawings may be exaggerated, omitted, or schematically illustrated for convenience and clarity of explanation, and the sizes of elements do not reflect their actual sizes completely. Detailed description of known functions and configurations incorporated herein will be omitted when it may make the subject matter of the present invention unclear.

Figure 1:
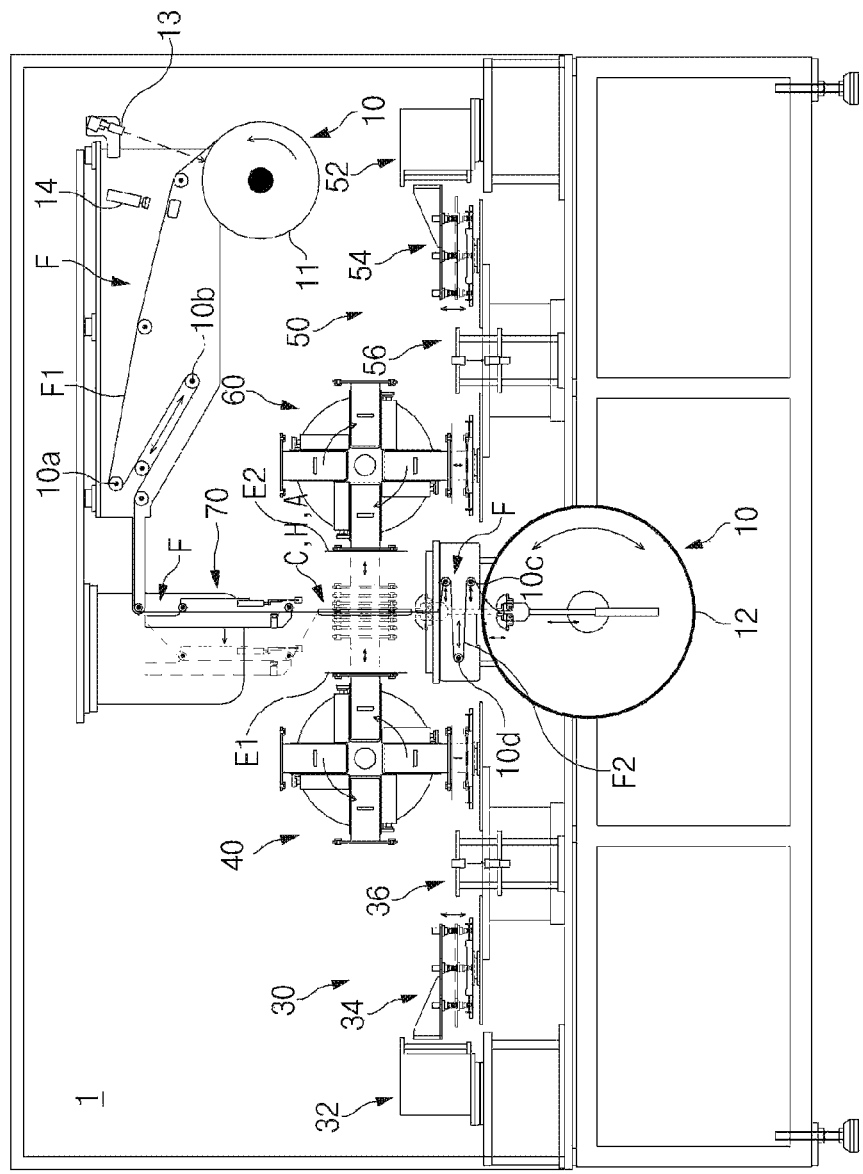
FIG. 1 is a front view of an apparatus for manufacturing an electrode assembly according to a preferred embodiment of the present invention.
Figure 2:
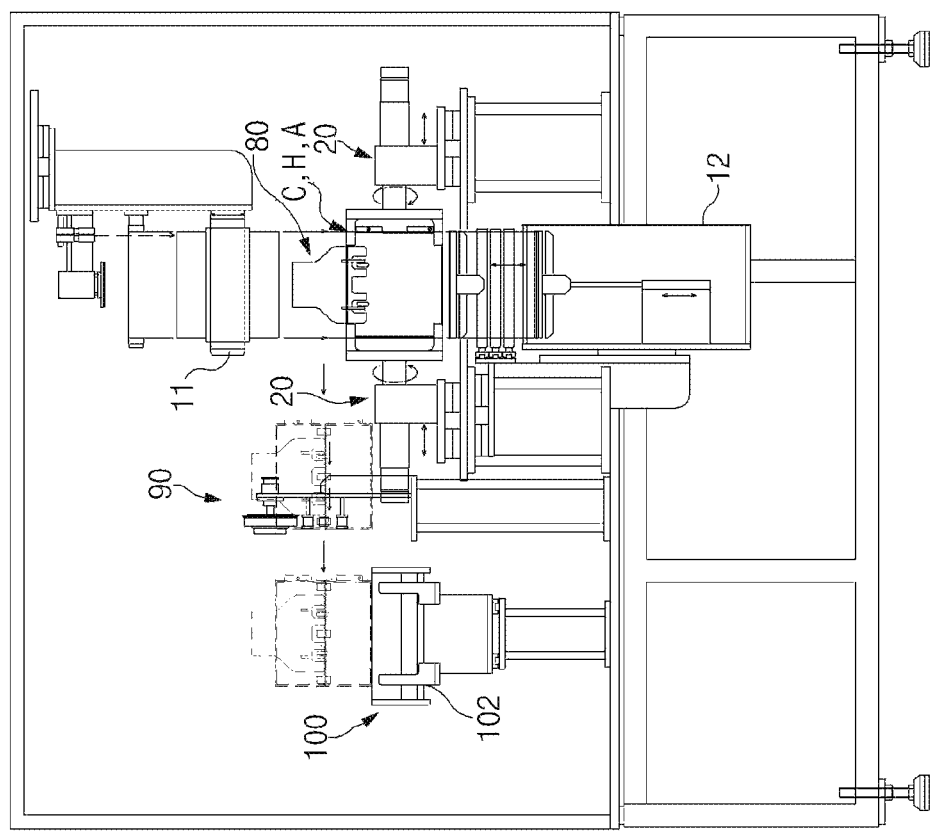
FIG. 2 is a side view of the apparatus for manufacturing an electrode assembly illustrated in FIG. 1.

FIG. 1 is a front view of an apparatus for manufacturing an electrode assembly according to a preferred embodiment of the present invention, and FIG. 2 is a side view of the apparatus for manufacturing an electrode assembly illustrated in FIG. 1.

An apparatus for manufacturing an electrode assembly 1 according to a preferred embodiment of the present invention (hereinafter referred to as 'the apparatus for manufacturing an electrode assembly 1') is an apparatus for manufacturing a stack/folding type electrode assembly by laminating a separator strip F, first electrode members E1, and second electrode members E2 in a predetermined order. Referring to FIGS. 1 to 2, the apparatus for manufacturing an electrode assembly 1 includes a separator feeding unit 10 for feeding the separator strip F; a separator folding unit 20 for winding the separator strip F fed from the separator feeding unit 10 around a core portion C of the separator strip F to form a spirally folded separator spiral H; a first electrode feeding unit 30 for feeding the first electrode members E1; a first electrode lamination unit 40 for laminating the first electrode members E1 fed from the first electrode feeding unit 30 on one surface of the separator spiral H; a second electrode feeding unit 50 for feeding the second electrode members E2; and a second electrode lamination unit 60 for laminating the second electrode members E2 fed from the second electrode feeding unit 50 on the other surface of the separator spiral H.

First, the separator feeding unit 10 is a device for feeding the separator strip F to manufacture an electrode assembly A.

The separator feeding unit 10 includes a first roll 11 on which one side of the separator strip F is wound in advance and a second roll 12 on which the other side of the separator strip F is wound in advance. The material of the separator strip F is not particularly limited, and the separator strip F may be formed of a material conventionally used to produce a separator.

As shown in FIG. 1, the first and second rolls 11 and 12 are spaced apart from each other by a predetermined distance so that the core portion C of the separator strip F is positioned therebetween. The core portion C of the separator strip F refers to a winding core for winding the separator strip F in a state in which the first and second electrode members E1 and E2 are interposed, and is provided at an intermediate portion between one side and the other side of the separator strip F. One end of the core portion C is connected to one side of the separator strip F wound on the first roll 11, and the other end of the core portion C is connected to the other side of the separator strip F wound on the second roll 12.

As shown in FIG. 1, on the first roll 11, one side of the separator strip F is wound in a roll form. The first roll 11 may feed the separator strip F toward the core portion C while unwinding the separator strip F in a stepwise manner by a predetermined length in accordance with the state of the electrode assembly A being manufactured.

As shown in FIG. 1, at least one first driven roller 10a and a first dancing roller 10b may be separately installed between the first roll 11 and the core portion C. The first driven rollers 10a are installed so that a separator strip F1 fed from the first roll 11 is seated on the first driven rollers 10a. The first driven rollers 10a may guide the separator strip F to the core portion C. As shown in FIG. 1, the first dancing roller 10b may reciprocate along a predetermined path to adjust tension acting on the separator strip F1, and at the same time, may temporarily store the separator strip F1 fed from the first roll 11 and deliver the separator strip F1 to the core portion C.

However, when constant feeding of the separator strip F to the core portion C by the first roll 11 is hampered due to meandering of the separator strip F or other cause, the quality of a secondary battery may be deteriorated. To solve such a problem, the separator feeding unit 10 may further include a reference laser head 13 capable of irradiating a reference laser to a predetermined position of the first roll 11, and a camera 14 for detecting meandering of the separator strip F.

Since a predetermined position of the first roll 11 is always irradiated with the reference laser emitted from the reference laser head 13, the position of the reference laser and the position of the separator strip F wound on the first roll 11 may be compared to determine whether the separator strip F is wound at a predetermined position. Therefore, when the separator strip F is not wound at a predetermined position, the position of the separator strip F may be adjusted to the predetermined position using a reference laser.

The camera 14 is installed so as to photograph the separator strip F1 fed from the first roll 11, and meandering of the separator strip F may be detected using the images of the separator strip F photographed using the camera 14. Therefore, when meandering of the separator strip F occurs, the path of the separator strip F may be compensated by a meandering angle, thereby preventing quality deterioration of a secondary battery due to meandering.

As shown in FIG. 1, on the second roll 12, the other side of the separator strip F opposite to one side of the separator strip F described above is wound. The second roll 12 may feed the separator strip F toward the core portion C while unwinding the separator strip F in a stepwise manner by a predetermined length in accordance with the state of the electrode assembly A being manufactured.

As shown in FIG. 1, at least one second driven roller 10c and a second dancing roller 10d may be separately installed between the second roll 12 and the core portion C. The second driven rollers 10c are installed so that a separator strip F2 fed from the second roll 12 is seated on the second driven rollers 10c. The second driven rollers 10c may guide the separator strip F to the core portion C. As shown in FIG. 1, the second dancing roller 10d may reciprocate along a predetermined path to control tension acting on the separator strip F, and at the same time, may temporarily store the separator strip F2 fed from the second roll 12 and deliver the separator strip F2 to the core portion C.

Figure 3:
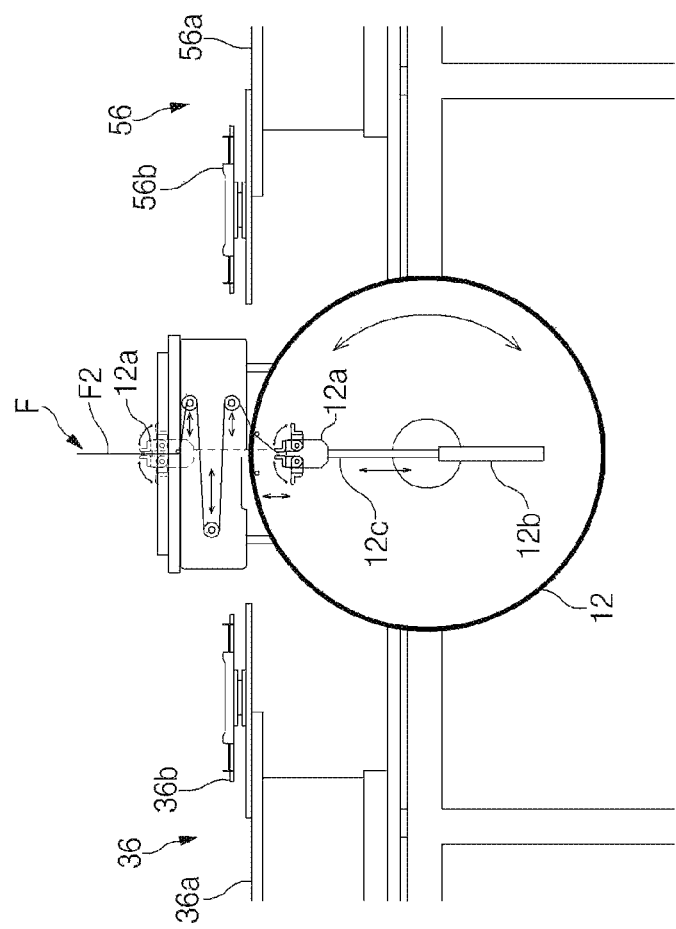
FIG. 3 is a front view of the second roll illustrated in FIG. 1.

FIG. 3 is a front view of the second roll illustrated in FIG. 1.

As described above, one side of the separator strip F is wound on the first roll 11 and the other side of the separator strip F is wound on the second roll 12. In general, a fabric having a strip shape elongated in the longitudinal direction is wound on a winding roll so that one end thereof is in a free-end state, and is stored in a roll form. For example, prior to operation, one side of the separator strip F is wound on the first roll 11 so that the other side of the separator strip F is in a free-end state, and the separator strip F is stored in a roll form. The other side of the separator strip F in a free-end state may be wound on the second roll 12 only when operation for manufacturing the electrode assembly A is started.

To perform the operation in this manner, as shown in FIG. 3, the second roll 12 may include a winding jig 12a capable of gripping or releasing the other end of the separator strip F and a first conveying member 12b capable of reciprocating the winding jig 12a so as to draw the winding jig 12a into the inside of the second roll 12 or to push the winding jig 12a out of the second roll 12.

As shown in FIG. 3, the winding jig 12a may have a pincer shape suitable for gripping or releasing the other end of the separator strip F. The winding jig 12a has a predetermined size so as to be able to enter and exit through the opening (not shown) formed in the second roll 12.

As shown in FIG. 3, the first conveying member 12b may be a cylinder having the winding jig 12a fixed to one end of a cylinder rod 12c. The first conveying member 12b may reciprocate the cylinder rod 12c to allow the winding jig 12a to move in and out of the second roll 12.

The other end of the separator strip F in a free-end state placed between the first and second rolls 11 and 12 is gripped by the winding jig 12a and the other end is moved into the inside of the second roll 12. In this state, the second roll 12 is rotationally driven in a predetermined direction so that the other side of the separator strip F may be wound around the circumferential surface of the second roll 12. In addition, when the separator strip F is fed, the second roll 12 is rotationally driven in the opposite direction to the predetermined direction so as to unwind the separator strip F and feed the separator strip F toward the core portion C.

Figure 4:
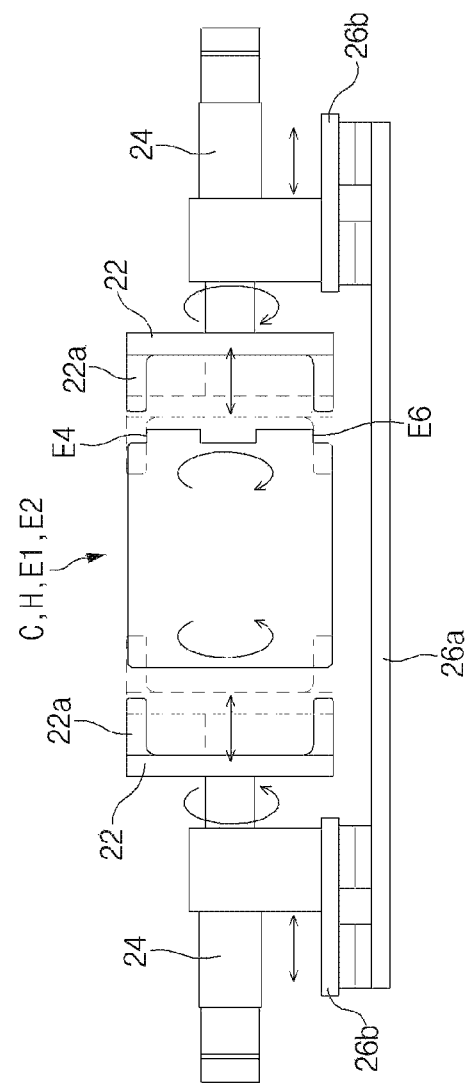
FIG. 4 is a front view of the separator folding unit illustrated in FIG. 2.
Figure 5:
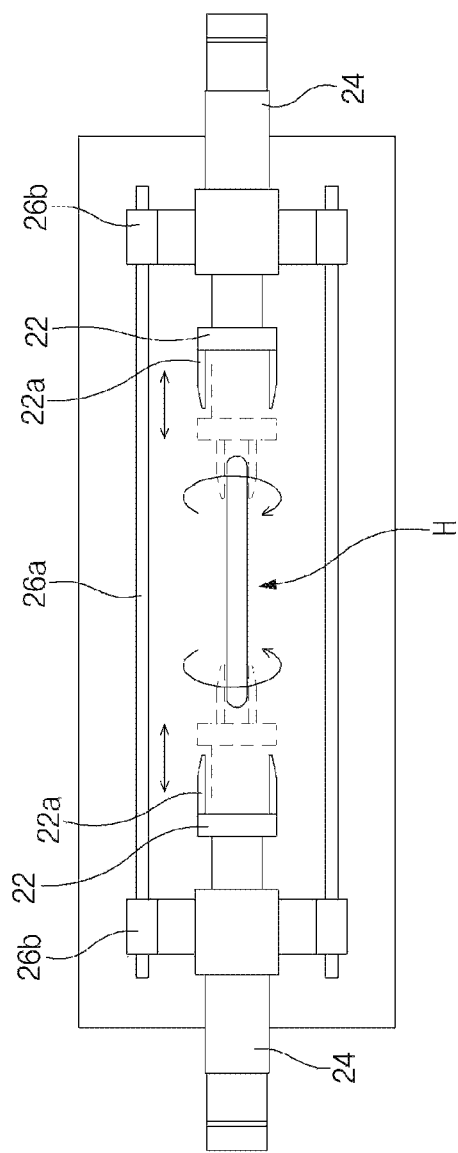
FIG. 5 is a top view of the separator folding unit illustrated in FIG. 4.
Figure 6:
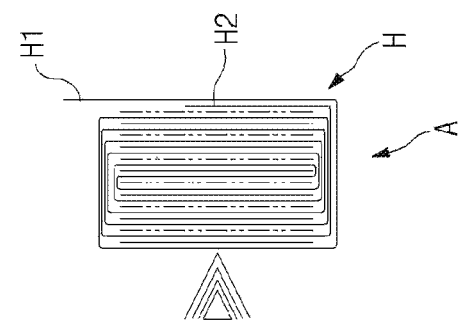
FIG. 6 includes drawings showing a process in which a separator strip is folded in a spiral shape by the separator folding unit illustrated in FIG. 4.
Figure 6:
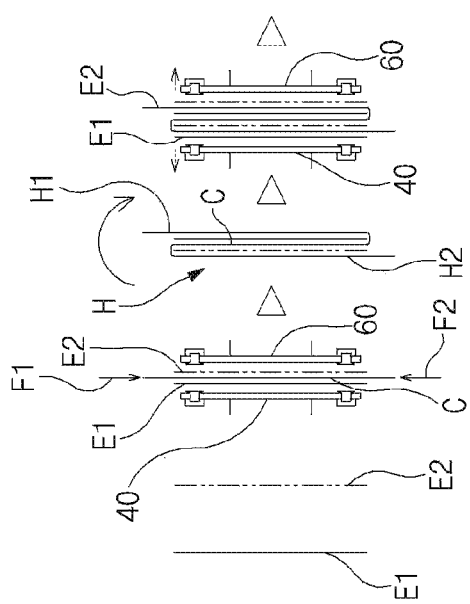

FIG. 4 is a front view of the separator folding unit illustrated in FIG. 2, FIG. 5 is a top view of the separator folding unit illustrated in FIG. 4, and FIG. 6 includes drawings showing a process in which a separator strip is folded in a spiral shape by the separator folding unit illustrated in FIG. 4.

Next, the separator folding unit 20 is a device for winding the separator strip F fed from the separator feeding unit 10 around the core portion C.

In the apparatus for manufacturing an electrode assembly 1, the separator strip F is folded in a spiral shape to form the separator spiral H, and the first and second electrode members E1 and E2 are interposed between two neighboring layers of the separator spiral H to obtain the electrode assembly A. To perform the operation in this manner, as shown in FIG. 2, the separator folding unit 20 is installed at a position corresponding to the position of the core portion C between the first and second rolls 11 and 12. By operation of the separator folding unit 20, the separator strip F is wound around the core portion C and the separator spiral H folded in a spiral shape about the core portion C and including at least the core portion C is formed.

As shown in FIG. 4, the separator folding unit 20 may include folding jigs 22 capable of gripping or releasing the separator spiral H and the first and second electrode members E1 and E2 newly laminated on the outer surface of the separator spiral H together, rotary members 24 that are axially coupled to the folding jigs 22 and rotate the folding jigs 22, and second conveying members 26 capable of reciprocating the folding jigs 22 so that the folding jigs 22 are brought close to or moved away from the separator spiral H. In this case, the newly laminated first and second electrode members E1 and E2 refer to the first and second electrode members E1 and E2 laminated on the core portion C or the outer surface of the separator spiral H without being wrapped by the separator strip F.

To stably wind the separator strip F around the core portion C, the separator strip F is preferably wound in a state wherein both end portions of each of the core portion C, the separator spiral H, and the electrode members E1 and E2 are gripped. Therefore, as shown in FIG. 4, the folding jigs 22, the rotary members 24, and the second conveying members 26 are provided in a pair, respectively, so that the core portion C, the separator spiral H, and the electrode members E1 and E2 are positioned between the respective pair.

As shown in FIG. 5, the folding jigs 22 may include grippers 22a capable of gripping or releasing one end of the separator spiral H and one end of each of the newly laminated first and second electrode members E1 and E2. As shown in FIG. 4, the folding jigs 22 may include the grippers 22a in pairs so as to grip or release the upper and lower ends of one end of the separator spiral H and the upper and lower ends of one end of each of the newly laminated first and second electrode members E1 and E2, respectively.

As shown in FIG. 5, the rotary members 24 are composed of motors, and may be axially coupled to the rotation shafts of the folding jigs 22. The rotary members 24 may rotate the folding jigs 22 around the rotation shafts to rotate the separator spiral H and the newly laminated first and second electrode members E1 and E2 gripped by the folding jigs 22 together.

As shown in FIG. 5, the second conveying members 26 may include linear rails 26a provided so as to cross the lower side of the separator spiral H and reciprocatable linear motors 26b movably coupled to the linear rails 26a and capable of moving close to or away from the separator spiral H. In particular, as shown in FIG. 4, the linear motors 26b are engaged with the rotary members 24 and reciprocate along the linear rails 26a to bring the rotary members 24 and the folding jigs 22 close to or away from the separator spiral H.

Hereinafter, referring to FIG. 6, a method of forming the electrode assembly A by laminating the separator strip F and the first and second electrode members E1 and E2 will be described.

First, the first electrode lamination unit 40 laminates the first electrode member E1 on the core portion C by pressing the first electrode member E1 against one surface of the core portion C, and the second electrode lamination unit 60 laminates the second electrode member E2 on the core portion C by pressing the second electrode member E2 on the other surface of the core portion C.

Next, the second conveying members 26 convey the rotary members 24 and the folding jigs 22 toward the core portion C so that the folding jigs 22 reach the core portion C, and the folding jigs 22 which have reached the core portion C grip the core portion C and the first and second electrode members E1 and E2 laminated on the core portion C together.

Thereafter, the first electrode lamination unit 40 releases the contact pressure acting on the first electrode member E1 laminated on one surface of the core portion C, and the second electrode lamination unit 60 releases the contact pressure acting on the second electrode member E2 laminated on the other surface of the core portion C.

Next, the rotary members 24 rotate the folding jigs 22 in an inverted manner in one predetermined direction so that the core portion C and the first and second electrode members E1 and E2 laminated on the core portion C gripped by the folding jigs 22 are rotated in an inverted manner in the one direction. At the same time, the first dancing roller 10b moves along a predetermined path so that the separator strip F1 fed from the first roll 11 and temporarily stored is fed toward the core portion C. In addition, the second dancing roller 10d moves along a predetermined path so that the separator strip F2 fed from the second roll 12 and temporarily stored is fed toward the core portion C.

Next, due to tension generated when the core portion C is rotated in an inverted manner, the separator strip F1 fed from the first roll 11 is pulled toward one end of the core portion C and wound around the core portion C. As a result, the separator strip F1 is folded to cover the first electrode member E1. In addition, due to tension generated when the core portion C is rotated in an inverted manner, the separator strip F2 fed from the second roll 12 is pulled toward the other end of the core portion C and wound around the core portion C. As a result, the separator strip F2 is folded to cover the second electrode member E2.

Through these processes, in the region between the first and second rolls 11 and 12, the separator spiral H including a first spiral part H1 connected to one end of the core portion C and folded in a spiral shape and a second spiral part H2 connected to the other end of the core portion C and folded in a spiral shape is formed.

In the separator spiral H, the core portion C is the minimum unit. The number of layers is increased by one layer by the newly wound separator strip F on the core portion C or the separator spiral H each time the core portion C or the separator spiral H is rotated in an inverted manner once. That is, the number of spiral layers of each of the first and second spiral parts H1 and H2 increases by one layer each time the core portion C or the separator spiral H is rotated in an inverted manner once. The first and second spiral parts H1 and H2 extend parallel to each other in the same spiral direction about the core portion C and form a double spiral structure in which at least some sections face each other.

Thereafter, the first electrode lamination unit 40 laminates the new first electrode member E1 on one surface of the separator spiral H, that is, the outermost side of the second spiral part H2 through contact by pressurization, and the second electrode lamination unit 60 laminates the new second electrode member E2 on the other surface of the separator spiral H, that is, the outermost side of the first spiral part H1 through contact by pressurization.

Next, the folding jigs 22 release the previously gripped core portion C and first and second electrode members E1 and E2, and the second conveying members 26 convey the rotary members 24 and the folding jigs 22 away from the separator spiral H.

When the folding jigs 22 release the core portion C and the first and second electrode members E1 and E2, the laminated state of the separator spiral H and the first and second electrode members E1 and E2 is still maintained by pressure exerted from the first and second electrode lamination units 40 and 60 and tension acting on the separator spiral H.

Thereafter, the rotary members 24 rotate the folding jigs 22 in the one direction or the opposite direction to the one direction in an inverted manner so as to return the folding jigs 22 to the original state thereof.

As a result, any one of the pair of legs of the grippers 22a provided on the folding jigs 22 always contacts only the first electrode member E1 and the other one always contacts only the second electrode member E2. Therefore, the particles of any type of electrode members stuck on the legs of the grippers 22a may be prevented from being transferred to the other type of electrode members.

Next, the second conveying members 26 convey the rotary members 24 and the folding jigs 22 toward the separator spiral H so that the folding jigs 22 reach the separator spiral H. In addition, the folding jigs 22 which have reached the separator spiral H grip the folded separator spiral H to cover the previously laminated first and second electrode members E1 and E2 and the newly laminated first and second electrode members E1 and E2 on the separator spiral H together.

Thereafter, the rotary members 24 rotate the folding jigs 22 in an inverted manner in the one direction so that the separator spiral H and the newly laminated first and second electrode members E1 and E2 on the separator spiral H are rotated in an inverted manner in the one direction. At the same time, the first dancing roller 10b moves along a predetermined path so that the separator strip F1 fed from the first roll 11 and temporarily stored is fed toward the core portion C. In addition, the second dancing roller 10d moves along a predetermined path so that the separator strip F2 fed from the second roll 12 and temporarily stored is fed toward the core portion C.

Next, due to tension generated when the separator spiral H is rotated in an inverted manner, the separator strip F1 fed from the first roll 11 is pulled toward one end of the separator spiral H and newly wound on the separator spiral H around the core portion C. As a result, the separator strip F1 is folded to cover the newly laminated second electrode member E2. In addition, due to tension generated when the separator spiral H is rotated in an inverted manner, the separator strip F2 fed from the second roll 12 is pulled toward the other end of the separator spiral H and newly wound on the separator spiral H around the core portion C.

As a result, the separator strip F2 is folded to cover the newly laminated first electrode member E1.

That is, each time the first and second electrode members E1 and E2 are newly laminated on the outer surface of the separator spiral H at least including the core portion C, the separator folding unit 20 may wind the separator strip H around the core portion C so that the newly laminated first and second electrode members E1 and E2 are covered with the separator strip F.

As a result, the first and second electrode members E1 and E2 are alternately interposed between the lowermost layer of the first spiral part H1 closest to the core portion C and the core portion C, between the lowermost layer of the second spiral part H2 closest to the core portion C and the core portion C, and between any one layer of the first spiral part H1 and any one layer of the second spiral part H2 adjacent to each other. Through this process, as shown in FIG. 6, the separator folding unit 20 may form the electrode assembly A in which the first and second electrode members E1 and E2 are alternately interposed between two neighboring layers of the separator spiral H.

In addition, the separator spiral H is formed by winding the separator strip F around the core portion C, and the first and second electrode members E1 and E2 are alternately interposed between two neighboring layers of the separator spiral H. Therefore, the cross-sectional area of the electrode assembly A increases stepwise in proportion to the cumulative length of the wound separator strip F and the cumulative number of the laminated first and second electrode members E1 and E2. As a result, the feeding length of the separator strip F necessary to cover the newly laminated first and second electrode members E1 and E2 on the separator spiral H with the newly wound separator strip F on the separator spiral H increases stepwise in proportion to the cumulative length of the wound separator strip F and the cumulative number of the electrodes of the first and second electrode members E1 and E2. Therefore, the first and second rolls 11 and 12 respectively increase the feeding length of the separator strip F stepwise in proportion to increase in the cross-sectional area of the electrode assembly A in accordance with increase in the cumulative length of the wound separator strip F and the cumulative number of the laminated first and second electrode members E1 and E2.

In addition, the total number of the first and second electrode members E1 and E2 to be laminated is not particularly limited and may be determined depending on predetermined process conditions that determine the thicknesses of the first and second electrode members E1 and E2, the capacity of the secondary battery, and the like. After the number of the first and second electrode members E1 and E2 to be laminated is determined, the total winding length of the separator strip F necessary to form the electrode assembly A is determined in accordance with the total number of the first and second electrode members E1 and E2 to be laminated.

However, the first spiral part H1 of the separator spiral H is connected to one side of the separator strip F wound on the first roll 11, and the second spiral part H2 of the separator spiral H is connected to the other side of the separator strip F wound on the second roll 12. Therefore, after the separator strip F is fed for the total winding length described above, it is necessary that the connections between each of the first and second spiral parts H1 and H2 and the residual separator strip F not wound on the separator spiral H are blocked.

To solve this problem, the other side of the separator strip F is wound on the second roll 12 by a predetermined winding length so that when the separator strip F is last wound on the separator spiral H after the last first and second electrode members E1 and E2 are laminated on the separator spiral H, the first spiral part H1 extends longer than the second spiral part H2 and as a result, covers one end of the second spiral part H2. That is, the other side of the separator strip F is wound on the second roll 12 by a predetermined winding length so that when the separator folding unit 20 grips the separator spiral H and the first and second electrode members E1 and E2 together after the last first and second electrode members E1 and E2 are laminated on the separator spiral H, and rotates the same in an inverted manner, the first spiral part H1 covers one end of the second spiral part H2.

In addition, the winding jig 12a of the second roll 12 releases the other end of the separator strip F at a predetermined time so that the other end of the separator strip F is wound on the separator spiral H around the core portion C to form one end of the second spiral part H2. As a result, the other end of the separator strip F which has been released from the winding jig 12a and has been in the free end state is spontaneously wound on the separator spiral H around the core portion C to form one end of the second spiral part H2.

In addition, as shown in FIG. 6, the separator strip F having a longer length than that of the second roll 12 is wound on the first roll 11 so that the first spiral part H1 completely covers one end of the second spiral part H2. In addition, one end of the first spiral part H1 connected to the residual separator strip F1 not wound on the separator spiral H may be cut by a cutting unit 70 to be described later.

The separator folding unit 20 may form the separator spiral H having a double-spiral structure in which the separator strip F is folded in a spiral shape about the core portion C by winding the separator strip F fed to the core portion C in both directions on the separator spiral H around the core portion C. In addition, the separator folding unit 20 newly winds the separator strip F every time the first and second electrode members E1 and E2 are laminated on both sides of the separator spiral H described above so that the newly laminated first and second electrode members E1 and E2 are covered with the newly wound separator strip F.

When the separator folding unit 20 is used, operation of winding and folding the separator strip F and operation of laminating the electrode members E1 and E2 may be performed together at a predetermined position corresponding to the core portion C. That is, at a fixed position corresponding to the core portion C, winding and folding of the separator strip F may be performed together. Therefore, compared to a conventional method of manufacturing a stack/folding type electrode assembly, in which a separator strip on which full cells or bicells are arranged in advance at predetermined gaps is sequentially rolled from one end of the separator strip to the other end thereof, when the apparatus for manufacturing an electrode assembly 1 is used, the manufacturing time of the electrode assembly A may be reduced, the manufacturing process of the electrode assembly A may be easily automated, and quality deterioration of a secondary battery due to carelessness or errors easily caused during the manufacturing process may be effectively prevented. In addition, when the apparatus for manufacturing an electrode assembly 1 is used, the electrode assembly A may be manufactured by winding the separator strip F fed from both directions around the core portion C, thereby further reducing the manufacturing time of the electrode assembly A.

Figure 7:
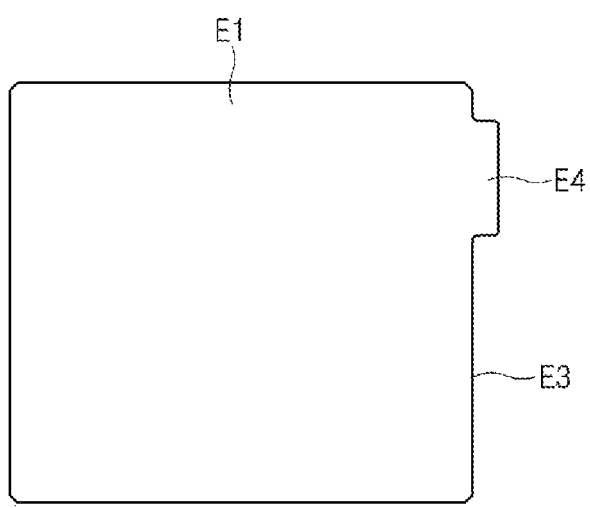
FIG. 7 is a top view of a first electrode member according to an aspect of the present invention.
Figure 8:
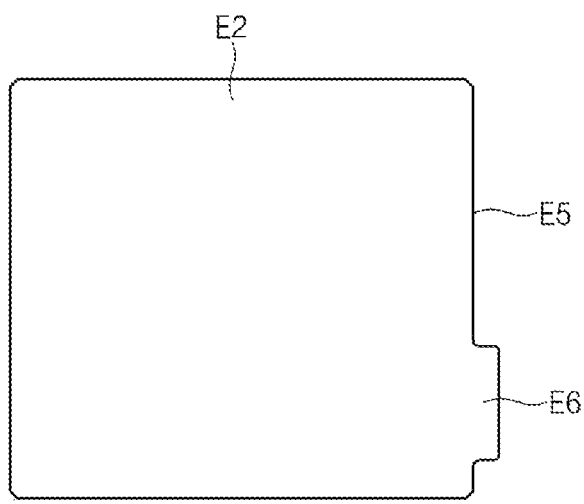
FIG. 8 is a top view of a second electrode member according to an aspect of the present invention.
Figure 9:
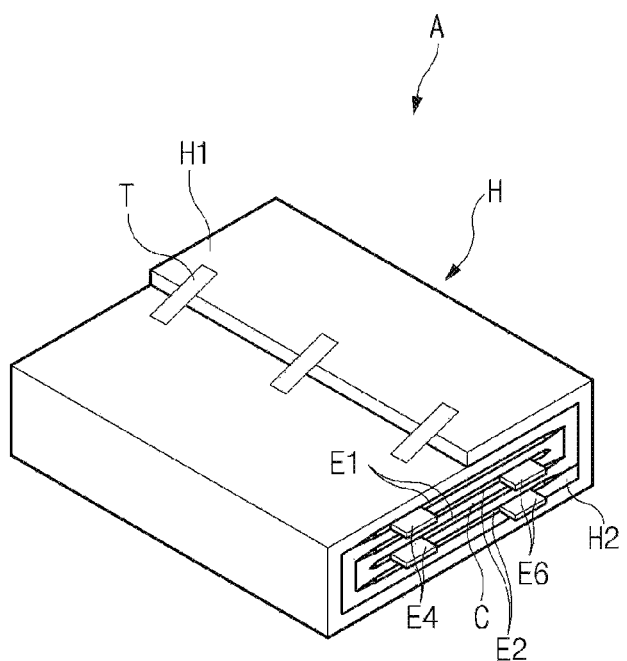
FIG. 9 is a perspective view of an electrode assembly according to an aspect of the present invention manufactured using the electrode members illustrated in FIGS. 7 and 8.

FIG. 7 is a top view of a first electrode member according to an aspect of the present invention, FIG. 8 is a top view of a second electrode member according to an aspect of the present invention, FIG. 9 is a perspective view of an electrode assembly according to an aspect of the present invention manufactured using the electrode members illustrated in FIGS. 7 and 8, and FIGS. 10 to 12 are drawings for explaining a lamination process by the electrode members illustrated in FIGS. 7 and 8.

Figure 13:
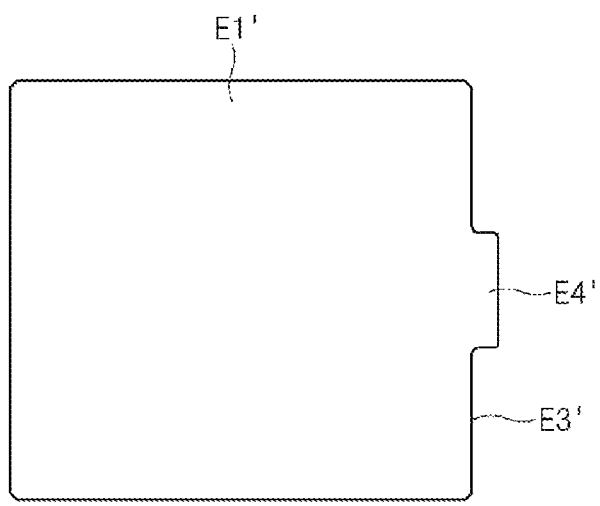
FIG. 13 is a top view of a first electrode member according to another aspect of the present invention.
Figure 14:
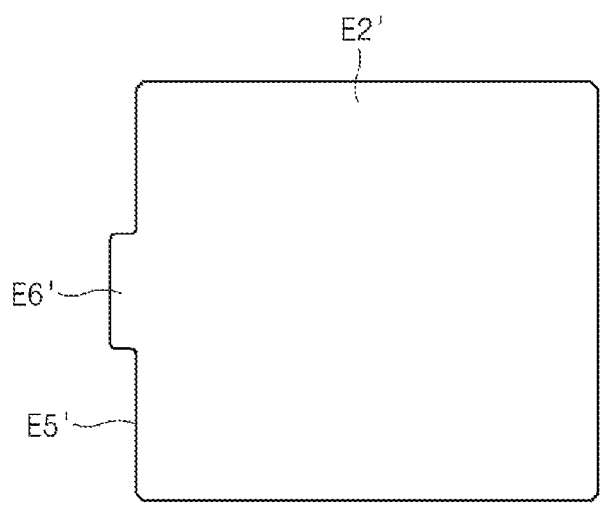
FIG. 14 is a top view of a second electrode member according to another aspect of the present invention.
Figure 15:
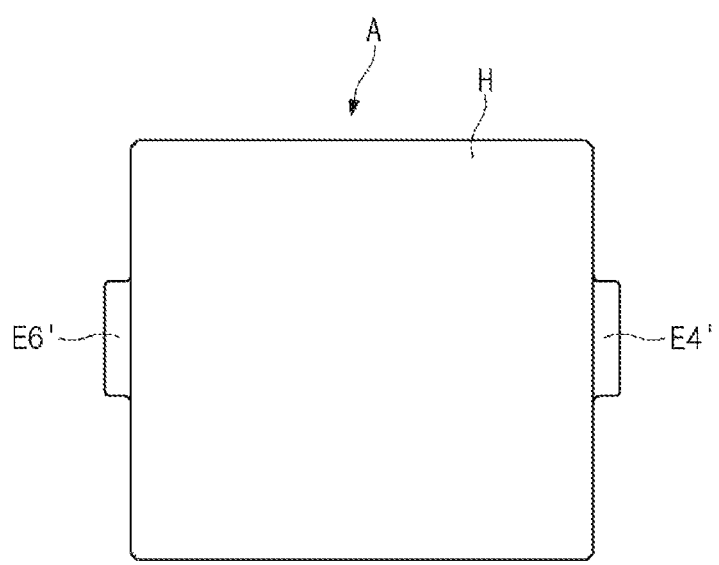
FIG. 15 is a perspective view of an electrode assembly according to another aspect of the present invention manufactured using the electrode members illustrated in FIGS. 13 and 14.

In addition, FIG. 13 is a top view of a first electrode member according to another aspect of the present invention, FIG. 14 is a top view of a second electrode member according to another aspect of the present invention, and FIG. 15 is a perspective view of an electrode assembly according to another aspect of the present invention manufactured using the electrode members illustrated in FIGS. 13 and 14.

The kinds of electrode members usable as the first and second electrode members E1 and E2 are not particularly limited. For example, as shown in FIGS. 7 and 8, the first electrode member E1 may be a positive electrode that is a unit having a predetermined area, and the second electrode member E2 may be a negative electrode that is a unit having a predetermined area. In addition, as shown in FIGS. 7 and 8, a positive electrode tab E4 is provided at one end E3 of the first electrode member E1, and a negative electrode tab E6 is provided at one end E5 of the second electrode member E2.

Since the electrode tabs E4 and E6 are provided, when the electrode assembly A is manufactured using the apparatus for manufacturing an electrode assembly 1, the first electrode lamination unit 40 should laminate the first electrode member E1 on one surface of the separator spiral H so that the positive electrode tab E4 protrudes outwardly through the gap between two neighboring layers of the separator spiral H, and correspondingly, the second electrode lamination unit 60 should laminate the second electrode member E2 on the other surface of the separator spiral H so that the negative electrode tab E6 protrudes outwardly through the gap between two neighboring layers of the separator spiral H.

As shown in FIGS. 7 and 8, the positive electrode tab E4 may be provided at a position spaced from the center of the one end E3 of the first electrode member E1 by a predetermined distance, and the negative electrode tab E6 may be provided at a position spaced from the center of the one end E5 of the second electrode member E2 by a predetermined distance.

As shown in FIG. 9, when the electrode assembly A is manufactured using the electrode members E1 and E2, the electrode members E1 and E2 are preferably laminated in such a manner that the electrode tabs E4 and E6 are co-located at the same side end portion of the electrode assembly A and the electrode tabs E4 and E6 having the same polarity are aligned in one line. That is, the first electrode members E1 are preferably laminated in such a manner that positive electrode tabs E4 are aligned in one line, and the second electrode members E2 are preferably laminated in such a manner that negative electrode tabs E6 are aligned in one line. When the electrode members E1 and E2 are aligned in this manner, the electrode tabs E4 and E6 having the same polarity may be easily electrically connected to each other.

Figure 10:
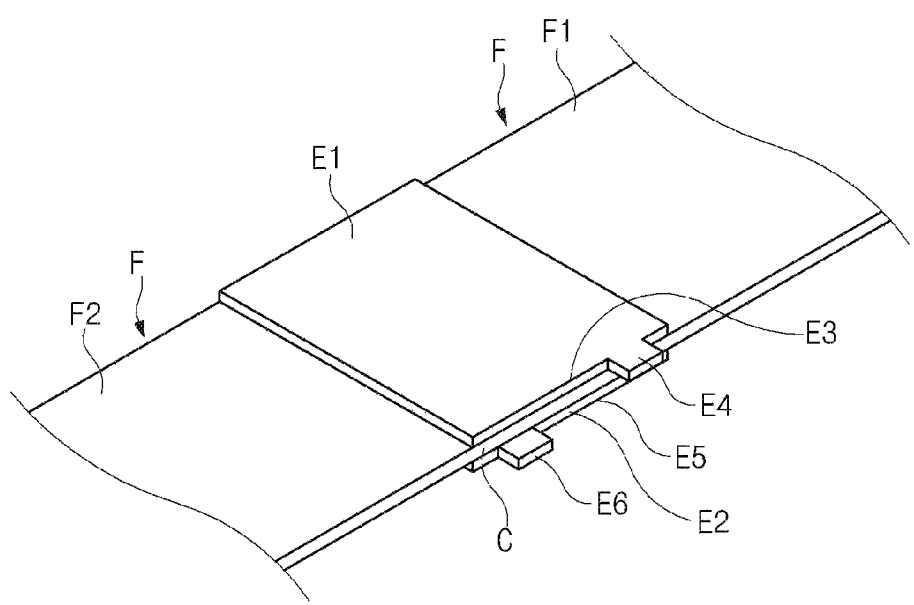
FIGS. 10 to 12 are drawings for explaining a lamination process by the electrode members illustrated in FIGS. 7 and 8.
Figure 11:
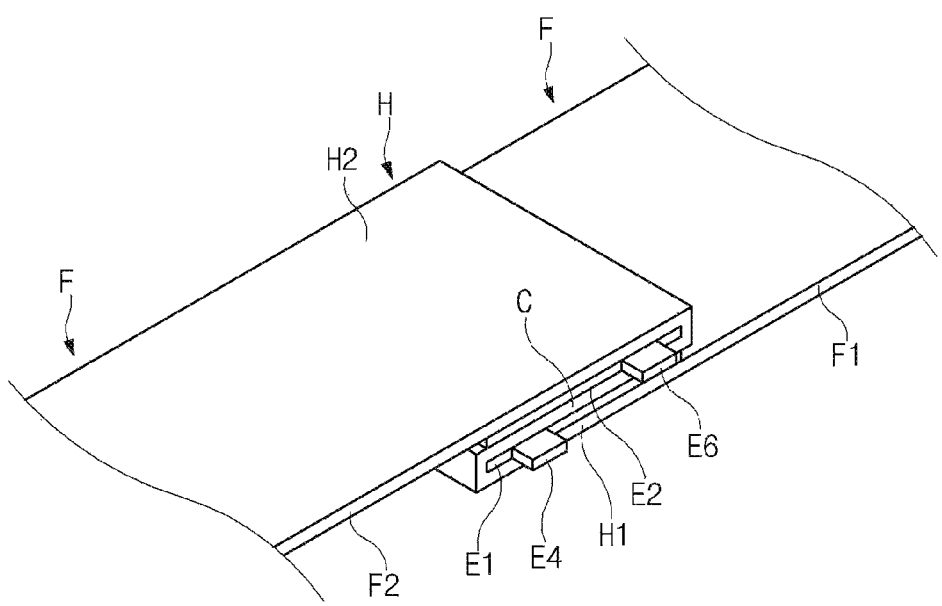

As shown in FIGS. 10 and 11, in the apparatus for manufacturing an electrode assembly 1, each time the electrode members E1 and E2 are newly laminated on the separator spiral H, the separator spiral H and the electrode members E1 and E2 are rotated in an inverted manner around the core portion C so that the newly laminated electrode members E1 and E2 are covered with the newly wound separator strip F on the separator spiral H. As a result, when the electrode members E1 and E2 are rotated in an inverted manner, the positions of the electrode tabs E4 and E6 are inverted with respect to the centers of one end (E3 and E5) of each of the electrode members E1 and E2. Therefore, when the electrode members E1 and E2 are simply laminated without considering the positional inversion of the electrode tabs E4 and E6, the positive and negative electrode tabs E4 and E6 may not be aligned in one line, respectively, and the positive and negative electrode tabs E4 and E6 may be aligned in a zigzag manner.

To solve this problem, in the apparatus for manufacturing an electrode assembly 1, the electrode members E1 and E2 are laminated in such a manner that the positions of the electrode tabs E4 and E6 are alternately changed each time the electrode members E1 and E2 are laminated.

Figure 12:
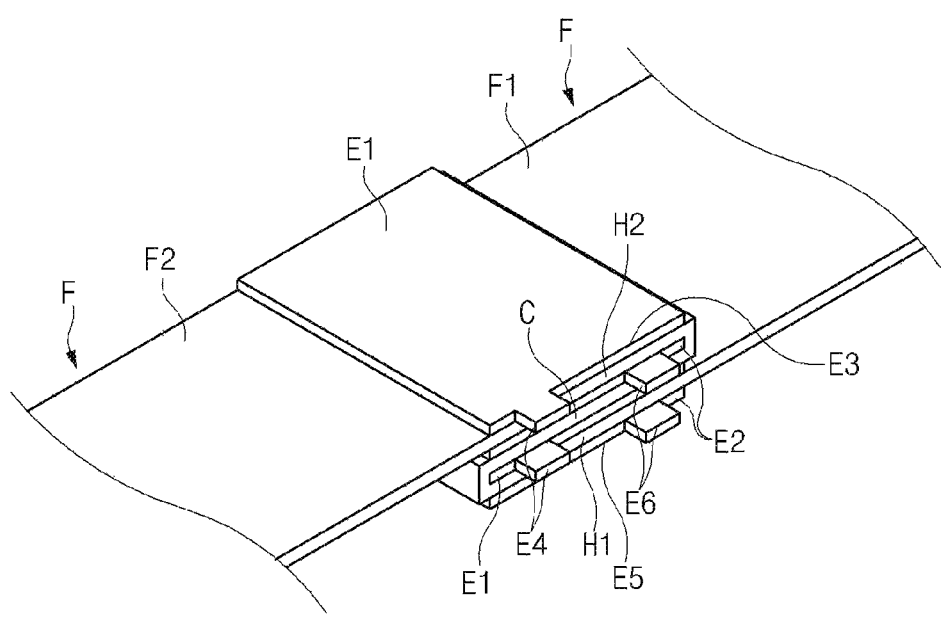

For example, as shown in FIGS. 10 and 12, in the apparatus for manufacturing an electrode assembly 1, the first electrode member E1 disposed such that the positive electrode tab E4 is eccentric to any one side with respect to the center of the one end E3 of the first electrode member E1 and the first electrode member E1 disposed such that the positive electrode tab E4 is eccentric to the other side opposite to the one side with respect to the center of the one end E3 of the first electrode member E1 may be alternately laminated on the separator spiral H.

For example, as shown in FIGS. 10 and 12, in the apparatus for manufacturing an electrode assembly 1, the second electrode member E2 disposed such that the negative electrode tab E6 is eccentric to the other side with respect to the center of the one end E5 of the second electrode member E2 and the second electrode member E2 disposed such that the negative electrode tab E6 is eccentric to the one side with respect to the center of the one end E5 of the second electrode member E2 may be alternately laminated on the separator spiral H.

In this case, as shown in FIGS. 10 and 12, in the apparatus for manufacturing an electrode assembly 1, to line up the electrode tabs E4 and E6 having the same polarity, the electrode members E1 and E2 may be laminated so that the eccentric directions of the positive and negative electrode tabs E4 and E6 are opposite to each other. As a result, as shown in FIG. 9, the positive electrode tabs E4 may be aligned in one line at one end of the electrode assembly A, and the negative electrode tabs E6 may be aligned in one line at one end of the electrode assembly A.

In this specification, the electrode tabs E4 and E6 are described as being spaced from the centers of the one ends E3 and E5 of the electrode members E1 and E2 by a predetermined distance, but the present invention is not limited thereto. That is, as shown in FIGS. 13 and 14, electrode tabs E4' and E6' may be formed at the centers of one end (E3' and E5') of each of electrode members E1' and E2'. In this case, since the positions of the electrode tabs E4' and E6' are not changed even when the electrode members E1' and E2' are inverted, the problem related to the positional inversion of the electrode tabs E4' and E6' need not be considered. As shown in FIG. 15, when an electrode assembly A' is manufactured using the electrode members E1' and E2', the electrode members E1' and E2' are preferably laminated in such a manner that positive and negative electrode tabs E4' and E6' each protrude outwardly through the gap between two neighboring layers of the separator spiral H, and are each located at the opposite side end portions of the electrode assembly A'. As a result, the positive electrode tabs E4' may be aligned in one line at one end of the electrode assembly A', and the negative electrode tabs E6' may be aligned in one line at the other end of the electrode assembly A'.

Figure 16:
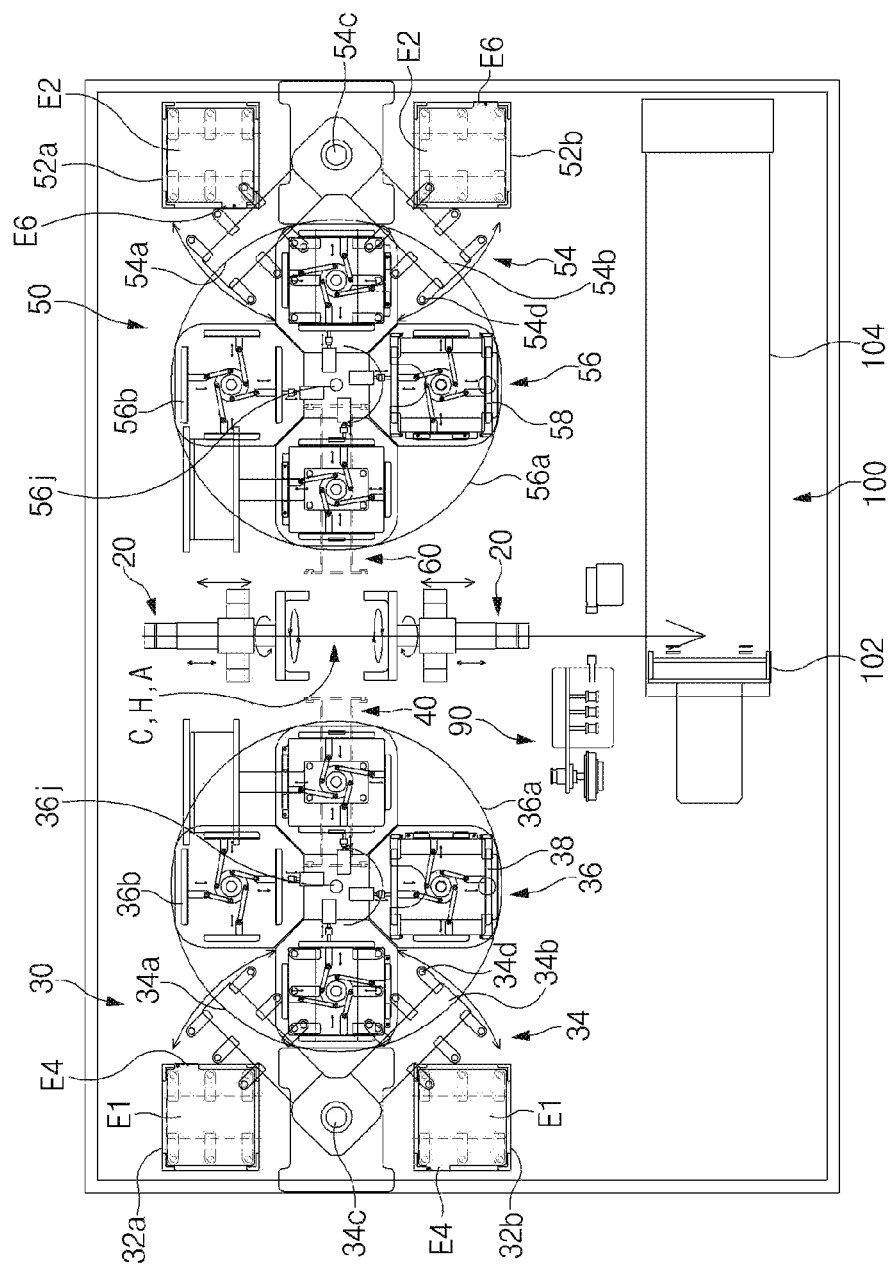
FIG. 16 is a top view of the apparatus for manufacturing an electrode assembly illustrated in FIG. 1.
Figure 17:
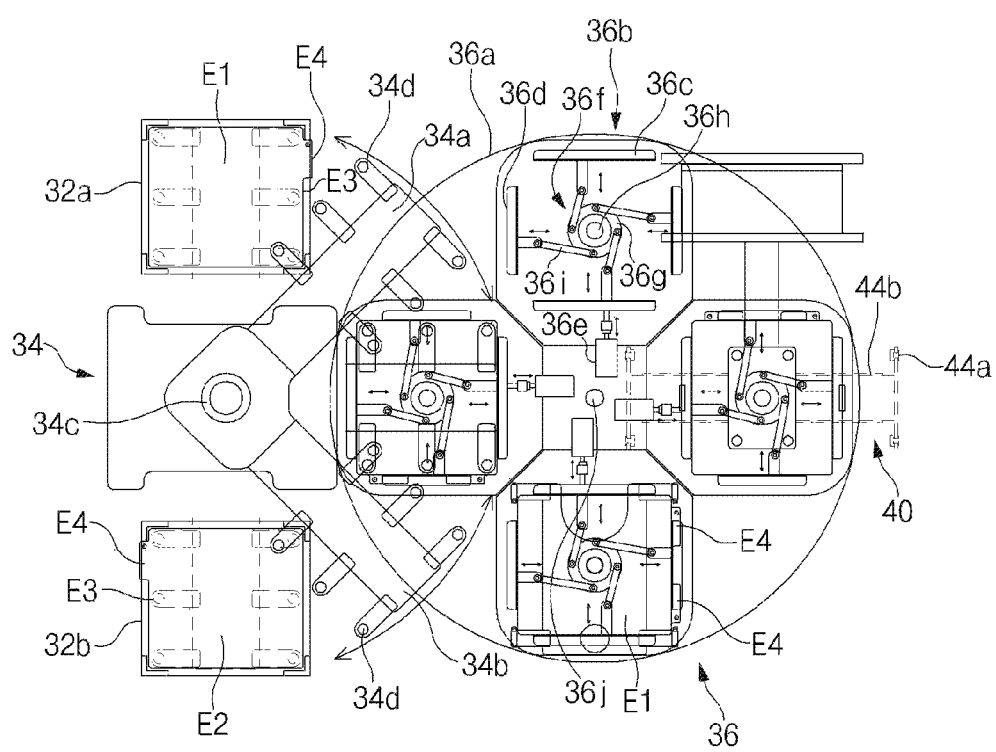
FIG. 17 is a top view showing the first electrode feeding unit and the first electrode lamination unit illustrated in FIG. 16.

FIG. 16 is a top view of the apparatus for manufacturing an electrode assembly illustrated in FIG. 1, and FIG. 17 is a top view showing the first electrode feeding unit and the first electrode lamination unit illustrated in FIG. 16.

Figure 18:
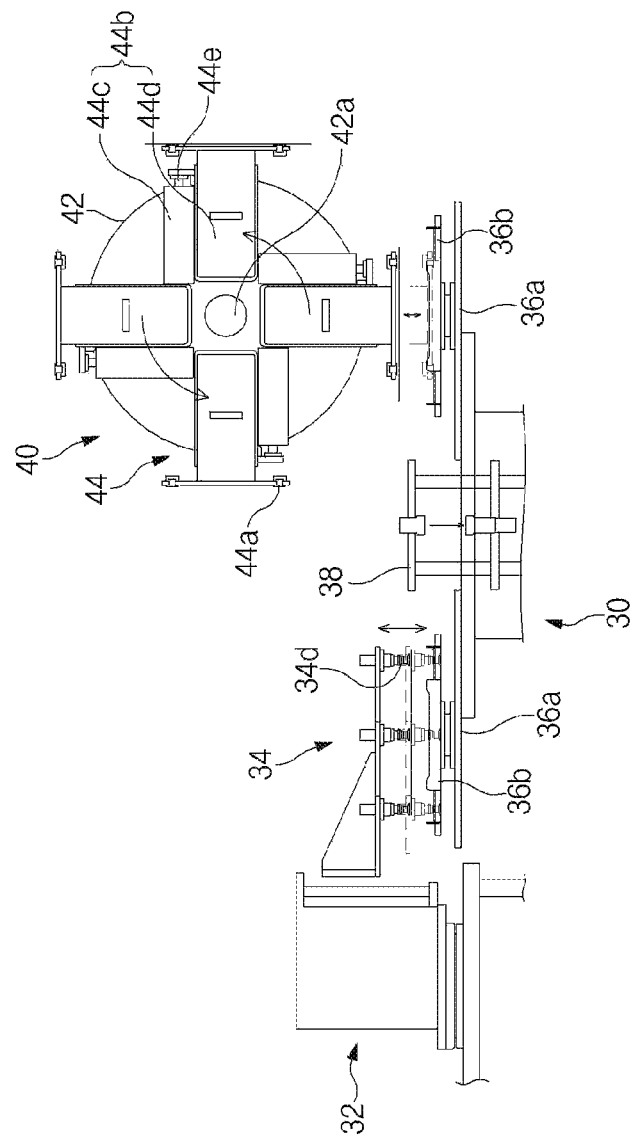
FIG. 18 is a front view showing the first electrode feeding unit and the first electrode lamination unit illustrated in FIG. 17.
Figure 19:
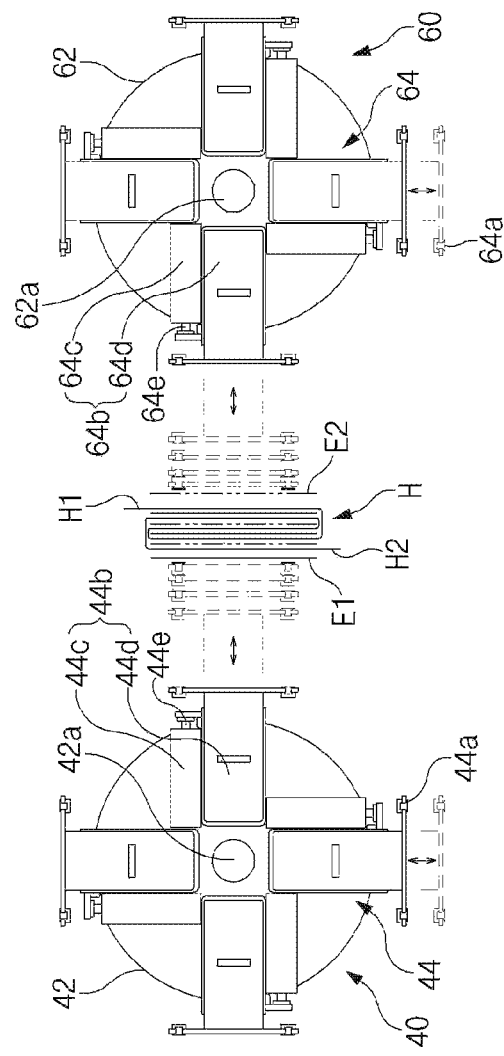
FIG. 19 is a drawing showing a manner in which electrode members are laminated on a separator spiral by the first and second electrode lamination units illustrated in FIG. 16.

In addition, FIG. 18 is a front view showing the first electrode feeding unit and the first electrode lamination unit illustrated in FIG. 17, and FIG. 19 is a drawing showing a manner in which electrode members are laminated on a separator spiral by the first and second electrode lamination units illustrated in FIG. 16.

As described above, the first electrode lamination unit 40 laminates the first electrode members E1 fed from the first electrode feeding unit 30 on one surface of the separator spiral H, and the second electrode lamination unit 60 laminates the second electrode members E2 fed from the second electrode feeding unit 50 on the other surface of the separator spiral H. To perform the operation in this manner, as shown in FIG. 16, the first electrode feeding unit 30 and the first electrode lamination unit 40 are installed on one side of the apparatus for manufacturing an electrode assembly 1 so as to correspond to one surface of the separator spiral H, and the second electrode feeding unit 50 and the second electrode lamination unit 60 are installed on the other side of the apparatus for manufacturing an electrode assembly 1 so as to correspond to the other surface of the separator spiral H. In addition, the second electrode feeding unit 50 and the second electrode lamination unit 60 are configured in the same manner as the first electrode feeding unit 30 and the first electrode lamination unit 40, except that the second electrode feeding unit 50 and the second electrode lamination unit 60 are installed symmetrically with respect to the first electrode feeding unit 30 and the first electrode lamination unit 40 with the separator spiral H therebetween, and the second electrode members E2 are laminated on the other surface of the separator spiral H.

Hereinafter, the electrode feeding units 30 and 50 and the electrode lamination units 40 and 60 will be described, taking the case of manufacturing the electrode assembly A as an example. Description of the electrode feeding units 30 and 50 and the electrode lamination units 40 and 60 may be applied to the case of manufacturing the electrode assembly A' except for the content related to the difference between the electrode assembly A and the electrode assembly A' described above.

First, the first electrode feeding unit 30 is a device for feeding the first electrode members E1 to be laminated on one surface of the separator spiral H.

As shown in FIG. 16, the first electrode feeding unit 30 is installed to be spaced from one surface of the separator spiral H by a predetermined distance. As shown in FIG. 16, the first electrode feeding unit 30 includes first load trays 32a and 32b on which the first electrode members E1 are loaded, a first electrode feeder 34 for feeding the first electrode members E1 from the first load trays 32a and 32b to the first electrode lamination unit 40, and a first electrode aligner 36 for aligning the first electrode members E1 fed from the first electrode feeder 34 in a predetermined arrangement manner and transferring the first electrode members E1 to the first electrode lamination unit 40.

In this case, the first electrode feeding unit 30 is preferably configured such that the first electrode members E1 fed from the first electrode feeder 34 are transferred to the first electrode lamination unit 40 via the first electrode aligner 36, but the present invention is not limited this configuration. That is, the first electrode aligner 36 may not be provided so that the first electrode members E1 are directly transferred to the first electrode lamination unit 40 by the first electrode feeder 34. Hereinafter, the first electrode feeding unit 30 will be described with reference to the case where the first electrode aligner 36 is provided.

As shown in FIG. 17, the first load trays 32a and 32b are provided in a pair so that the first electrode members E1 composed of a positive electrode as a unit substance are laminated on each tray. The type of positive electrode materials usable as the first electrode members E1 is not particularly limited. The first electrode members E1 may be composed of the same positive electrode material commonly used to manufacture an electrode assembly.

The first load trays 32a and 32b are installed so that the first electrode aligner 36 is positioned between the first load trays 32a and 32b and the separator spiral H. At this time, the first load trays 32a and 32b are symmetrically installed with a rotation shaft 34c of the first electrode feeder 34 therebetween so as to correspond to the rotation path of first feeding arms 34a and 34b of the first electrode feeder 34. Preferably, the first load trays 32a and 32b are installed in such a manner that an imaginary line (not shown) connecting the rotation shaft 34c of the first electrode feeder 34 and the center of one surface of the separator spiral H and an imaginary line (not shown) connecting the center portions of the first load trays 32a and 32b are perpendicular to each other.

As shown in FIG. 17, the first electrode members E1 are loaded on any one of the first load trays 32a and 32b such that the positive electrode tabs E4 are disposed in the direction toward the separator spiral H, and the first electrode members E1 are loaded on the other one of the first load trays 32a and 32b such that the positive electrode tabs E4 are disposed in the direction opposite to the direction toward the separator spiral H. That is, the first electrode members E1 loaded on any one of the first load trays 32a and 32b and the first electrode members E1 loaded on the other one of the first load trays 32a and 32b are symmetrically disposed. As a result of this arrangement, as shown in FIG. 17, the first load trays 32a and 32b may alternately feed the first electrode member E1 disposed such that the positive electrode tab E4 is eccentric to any one side with respect to the center of the one end E3 of the first electrode member E1 and the first electrode member E1 disposed such that the positive electrode tab E4 is eccentric to the other side with respect to the center of the one end E3 of the first electrode member E1. As a result, the first electrode members E1 may be laminated on the separator spiral H so that the positive electrode tabs E4 are aligned in one line.

As shown in FIG. 17, the first electrode feeder 34 includes a pair of the first feeding arms 34a and 34b capable of gripping or releasing the first electrode members E1 loaded on the first load trays 32a and 32b, wherein one ends of each of the first feeding arms 34a and 34b are connected to each other so that the first feeding arms 34a and 34b are arranged at a predetermined angle, and the first feeding arms 34a and 34b are rotatable around the rotation shaft 34c provided at the one ends. As shown in FIG. 17, the first electrode feeder 34 is installed to be spaced by an integer multiple (for example, 180°) of the rotation angle spacing of the first electrode lamination unit 40 and a first alignment plate 36a to be described later with respect to a rotation shaft 36j of the first alignment plate 36a.

The rotation shaft 34c is axially coupled to a driving motor (not shown), so that the first feeding arms 34a and 34b may be rotated around the rotation shaft 34c. To allow the first feeding arms 34a and 34b to face the first load trays 32a and 32b when rotated around the rotation shaft 34c, the first feeding arms 34a and 34b have a length corresponding to the gap between the rotation shaft 34c and the first load trays 32a and 32b. In addition, the first feeding arms 34a and 34b have a higher installation height than the installation height of the first load trays 32a and 32b.

As shown in FIGS. 17 and 18, the first feeding arms 34a and 34b are provided at a predetermined angle so that, when any one of the first feeding arms 34a and 34b faces any one of the first load trays 32a and 32b corresponding thereto, the other one of the first feeding arms 34a and 34b faces any one of first alignment members 36b of the first electrode aligner 36 to be described later. For example, as shown in FIG. 17, the first feeding arms 34a and 34b may be arranged perpendicular to each other.

Each of the first feeding arms 34a and 34b may include first vacuum adsorption pads 34d capable of vacuum-adsorbing or desorbing the first electrode members E1 to grip or release the first electrode members E1. The number of the first vacuum adsorption pads 34d to be installed is not particularly limited, and each of the first feeding arms 34a and 34b may include at least one first vacuum adsorption pad 34d to stably grip or release the first electrode members E1.

As shown in FIG. 17, the first electrode feeder 34 operates in such a manner that, when the first alignment plate 36a of the first electrode aligner 36 to be described later is stopped after being rotated by a predetermined angle, the first vacuum adsorption pads 34d of any one of the first feeding arms 34a and 34b grip the first electrode member E1 from any one of the first load trays 32a and 32b, and at the same time, the first vacuum adsorption pads 34d of the other one of the first feeding arms 34a and 34b release the first electrode member E1 previously gripped from the other one of the first load trays 32a and 32b so that the first electrode member E1 is seated on any one of the first alignment members 36b of the first electrode aligner 36. As shown in FIG. 17, the first electrode feeder 34 may alternately feed the first electrode member E1 disposed such that the positive electrode tab E4 is eccentric to any one side with respect to the center of the one end E3 of the first electrode member E1 and the first electrode member E1 disposed such that the positive electrode tab E4 is eccentric to the other side with respect to the center of the one end E3 of the first electrode member E1 to the first electrode aligner 36.

As shown in FIG. 16, the first electrode aligner 36 is installed so as to be positioned between the first electrode feeder 34 and the separator spiral H. As shown in FIG. 17, the first electrode aligner 36 may include the first alignment plate 36a that repeatedly performs an operation of rotating around the rotation shaft 36j by a predetermined rotation angle spacing and then stopping for a predetermined time period and the first alignment members 36b that are radially installed on the first alignment plate 36a so as to be spaced apart from each other by the rotation angle spacing with respect to the rotation shaft 36j of the first alignment plate 36a and that align the first electrode members E1 in a predetermined arrangement.

The first alignment plate 36a has a turntable structure and repeatedly performs an operation of rotating around the rotation shaft 36j axially coupled to a driving motor (not shown) by the rotation angle spacing and then stopping for a predetermined time period. The length of the rotation angle spacing is not particularly limited. For example, the first alignment plate 36a may repeatedly perform an operation of rotating by 90° and then stopping.

The first alignment members 36b are radially installed on the first alignment plate 36a so as to be spaced apart from each other by the same angle spacing as the rotation angle spacing of the first alignment plate 36a. For example, when the rotation angle spacing of the first alignment plate 36a is 90°, the four first alignment members 36b may be radially disposed on the first alignment plate 36a so as to be spaced apart from each other by 90°. In addition, as shown in FIG. 18, the first alignment members 36b may be disposed at the predetermined positions of the first alignment plate 36a so that, when the first alignment plate 36a is stopped after being rotated by rotation angle spacing, any one of the first alignment members 36b faces the first vacuum adsorption pads 34d of any one of the first feeding arms 34a and 34b, and at the same time, the other one of the first alignment members 36b faces any one of first electrode laminators 44 of the first electrode lamination unit 40 to be described later. In this case, as shown in FIG. 17, the angle spacing between any one of the first alignment members 36b and the other one of the first alignment members 36b is the same as the angle spacing between the first electrode feeder 34 and the first electrode lamination unit 40, that is, 180°.

Each of the first alignment members 36b includes a pair of first alignment bars 36c installed to be reciprocally movable in the width direction of the first electrode member E1, a pair of second alignment bars 36d installed to be reciprocally movable in the longitudinal direction of the first electrode member E1, a cylinder 36e for reciprocating any one of the first and second alignment bars 36c and 36d, and a connection linker 36f for interconnecting the first and second alignment bars 36c and 36d so that, when any one of the alignment bars is reciprocated by the cylinder 36e, the other alignment bars are also reciprocated. In addition, the connection linker 36f includes a link core 36g rotatable in a clockwise or counterclockwise direction around a rotation shaft 36h and a plurality of link bars 36i, one end of each of which is hinged to the link core 36g to be eccentric from the rotation shaft 36h, and the other end of each of which is hinged to any one of the alignment bars corresponding thereto.

When the first alignment members 36b are provided, when any one of the alignment bars is moved away from the link core 36g by the cylinder 36e, the other alignment bars are also moved away from the link core 36g. In addition, when any one of the alignment bars is brought close to the link core 36g by the cylinder 36e, the other alignment bars are also brought close to the link core 36g. Therefore, as shown in FIG. 17, when the first electrode members E1 released from the first vacuum adsorption pads 34d of the first feeding arms 34a and 34b are seated on the regions between alignment bars with the alignment bars being spaced apart from each other, the first alignment members 36b may be driven to bring the alignment bars into contact with the first electrode members E1 and to align the first electrode members E1 in a predetermined arrangement.

In addition, the first electrode members E1 loaded on the first load trays 32a and 32b may be stuck to each other due to static electricity or the like. In this case, the two or more first electrode members E1 are fed together while being attached to each other, and are laminated together on one surface of the separator spiral H, thereby deteriorating the performance of a secondary battery. To solve this problem, as shown in FIGS. 17 and 18, the first electrode feeding unit 30 may further include a first electrode sensor 38 that is installed between the first electrode feeder 34 and the first electrode lamination unit 40 so as to be spaced apart from each of the first electrode feeder 34 and the first electrode lamination unit 40 by an integer multiple of the rotation angle spacing of the first alignment plate 36a with respect to the rotation shaft 36j of the first alignment plate 36a, and that is capable of detecting whether the two or more first electrode members E1 are seated on the first alignment members 36b. As shown in FIG. 17, when the first electrode feeder 34 and the first electrode lamination unit 40 are spaced apart from each other by 180° with respect to the rotation shaft 36j of the first alignment plate 36a, the first electrode sensor 38 may be installed between the first electrode feeder 34 and the first electrode lamination unit 40 so as to be spaced apart from each of the first electrode feeder 34 and the first electrode lamination unit 40 by 90°. The structure of the first electrode sensor 38 is not particularly limited, and the first electrode sensor 38 may be constituted by a commonly used two-piece detection sensor.

Next, the first electrode lamination unit 40 is a member for laminating the first electrode members E1 fed from the first electrode feeding unit 30 on one surface of the separator spiral H.

As shown in FIG. 17, the first electrode lamination unit 40 is installed so as to be spaced apart from the first electrode feeder 34 by an integer multiple (e.g., 180°) of the rotation angle spacing of the first alignment plate 36a with respect to the rotation shaft 36j of the first alignment plate 36a. As shown in FIG. 18, the first electrode lamination unit 40 may include a first lamination plate 42 that repeatedly performs an operation of rotating around a rotation shaft 42a by a predetermined rotation angle spacing and then stopping for a predetermined time period, and the first electrode laminators 44 radially installed on the first lamination plate 42 so as to be spaced apart from each other by the same angle spacing as the rotation angle spacing of the first lamination plate 42 with respect to the rotation shaft 42a of the first lamination plate 42 and capable of laminating the first electrode members E1 seated on the first alignment members 36b on one surface of the separator spiral H.

The first lamination plate 42 has a turntable structure and repeatedly performs an operation of rotating around the rotation shaft 42a axially coupled to a driving motor (not shown) by the rotation angle spacing and then stopping for a predetermined time period. As shown in FIG. 18, the first lamination plate 42 is spaced apart from the first electrode aligner 36 by a predetermined distance so that the first electrode laminators 44 and the first electrode aligner 36 do not interfere with each other.

The length of the rotation angle spacing of the first lamination plate 42 is not particularly limited. For example, the first lamination plate 42 may repeatedly perform an operation of rotating by 90° and then stopping. In addition, the first lamination plate 42 preferably has a driving period identical to that of the first alignment plate 36a of the first electrode aligner 36 described above. That is, the first lamination plate 42 is driven to rotate and stop simultaneously with the first alignment plate 36a.

The first electrode laminators 44 are radially installed on the first lamination plate 42 so as to be spaced apart from each other by the same angle spacing as the rotation angle spacing of the first lamination plate 42. For example, when the rotation angle spacing of the first lamination plate 42 is 90°, the four first electrode laminators 44 may be disposed on the first lamination plate 42 so as to be spaced apart from each other by 90°. In addition, as shown in FIGS. 18 and 19, the first electrode laminators 44 may be disposed at the predetermined positions of the first lamination plate 42 so that, when the first lamination plate 42 is stopped after being rotated by the rotation angle spacing, any one of the first electrode laminators 44 faces the first electrode member E1 mounted on any one of the first alignment members 36b, and at the same time, the other one of the first electrode laminators 44 faces one surface of the separator spiral H.

As shown in FIG. 18, the first electrode laminators 44 may include second vacuum adsorption pads 44a capable of vacuum-adsorbing or desorbing the first electrode members E1 seated on the first alignment members 36b and third conveying member 44b capable of reciprocating the second vacuum adsorption pads 44a so that the second vacuum adsorption pads 44a are brought close to or moved away from the rotation shaft 42a of the first lamination plate 42.

The second vacuum adsorption pads 44a are installed on one end of a guide member 44d of the third conveying member 44b to be described later so as to face the first alignment members 36b or one surface of the separator spiral H. The number of the second vacuum adsorption pads 44a to be installed is not particularly limited, and the first electrode laminators 44 may have at least one second vacuum adsorption pad 44a so as to stably grip or release the first electrode members E1.

As shown in FIG. 18, the third conveying member 44b may include a cylinder 44c capable of reciprocating a cylinder rod 44e so that the cylinder rod 44e is brought close to or moved away from the rotation shaft 42a of the first lamination plate 42 and the guide member 44d coupled to the cylinder rod 44e so as to be reciprocated with the cylinder rod 44e. In addition, the second vacuum adsorption pads 44a are fixed to one end of the guide member 44d. This configuration allows the third conveying member 44b to reciprocate the second vacuum adsorption pads 44a so that the second vacuum adsorption pads 44a are brought close to or moved away from the rotation shaft 42a of the first lamination plate 42. The third conveying member 44b may include any one of various driving members capable of translational movement instead of the above-described cylinder 44c.

As shown in FIGS. 18 and 19, the first electrode lamination unit 40 operates in such a manner that, when the first alignment plate 36a and the first lamination plate 42 are rotated by a predetermined rotation angle and then stopped at the same time, the second vacuum adsorption pads 44a of any one of the first electrode laminators 44 are moved toward the first alignment members 36b facing the second vacuum adsorption pads 44a and then the second vacuum adsorption pads 44a grip the first electrode member E1, and at the same time, the second vacuum adsorption pads 44a of the other one of the first electrode laminators 44 are moved toward one surface of the separator spiral H facing the second vacuum adsorption pads 44a and then the second vacuum adsorption pads 44a press the first electrode member E1, which has been gripped in advance, against one surface of the separator spiral H.

In addition, the first electrode lamination unit 40 is driven in such a manner that, when the folding jigs 22 described above grip the separator spiral H and the first electrode member E1 pressed against the separator spiral H by the other one of the first electrode laminators 44 in a state wherein the first electrode member E1 is pressed against one surface of the separator spiral H by the other one of the first electrode laminators 44, the second vacuum adsorption pads 44a of the other one of the first electrode laminators 44 release the first electrode member E1. Then, the first electrode member E1 released from the second vacuum adsorption pads 44a while being gripped by the folding jigs 22 is covered with the newly wound separator strip F on the separator spiral H when the folding jigs 22 are rotated in an inverted manner, and as a result, the first electrode members E1 are interposed between two neighboring layers of the separator spiral H.

In addition, the second electrode feeding unit 50 and the second electrode lamination unit 60 have the same configuration as the first electrode feeding unit 30 and the first electrode lamination unit 40, except that the second electrode feeding unit 50 and the second electrode lamination unit 60 are installed symmetrically with respect to the first electrode feeding unit 30 and the first electrode lamination unit 40 with the separator spiral H interposed therebetween so that the second electrode members E2 composed of a negative electrode which is a unit substance are fed on the other surface of the separator spiral H. Therefore, the second electrode feeding unit 50 and the second electrode lamination unit 60 will be briefly described.

First, the second electrode feeding unit 50 is a device for feeding the second electrode members E2 to be laminated on the other surface of the separator spiral H.

As shown in FIG. 16, the second electrode feeding unit 50 includes a pair of second load trays 52*a* and 52*b*, wherein the second electrode members E2 composed of a negative electrode which is a unit substance are symmetrically loaded in each of the second load trays 52*a* and 52*b*, a second electrode feeder 54 for feeding the second electrode members E2 from the second load trays 52*a* and 52*b* to the second electrode lamination unit 60, a second electrode aligner 56 for aligning the second electrode members E2 fed from the second electrode feeder 54 in a predetermined arrangement and transferring the second electrode members E2 to the second electrode lamination unit 60, and a second electrode sensor 58 capable of detecting whether the two or more second electrode members E2 are fed while being stuck together. The material of the negative electrode usable as the second electrode member E2 is not particularly limited, and the second electrode member E2 may be composed of the same negative electrode material commonly used to manufacture an electrode assembly.

As shown in FIG. 16, in any one of second load trays 52*a* and 52*b*, the second electrode members E2 are loaded so that the negative electrode tabs E6 face the separator spiral H, and in the other one of the second load trays 52*a* and 52*b*, the second electrode members E2 are loaded so that the negative electrode tabs E6 face the opposite side of the separator spiral H. That is, in the second load trays 52*a* and 52*b*, the second electrode members E2 are respectively loaded so as to be symmetrical. Then, the second load trays 52*a* and 52*b* may alternately feed the second electrode member E2 disposed such that the negative electrode tab E6 is eccentric to any one side with respect to the center of the one end E5 of the second electrode member E2 and the second electrode member E2 disposed such that the negative electrode tab E6 is eccentric to the other side with respect to the center of the one end E5 of the second electrode member E2. As a result, the second electrode members E2 may be laminated on the separator spiral H so that the negative electrode tabs E6 are aligned in one line.

As shown in FIG. 16, the second electrode feeder 54 is provided with a pair of second feeding arms 54*a* and 54*b* capable of gripping or releasing the second electrode members E2 loaded on the second load trays 52*a* and 52*b*, wherein one ends of each of the second feeding arms 54*a* and 54*b* are connected to each other so that the second feeding arms 54*a* and 54*b* are arranged at a predetermined angle, and the second feeding arms 54*a* and 54*b* are rotatable around a rotation shaft 54*c* provided at the one ends. Each of the second feeding arms 54*a* and 54*b* may include at least one third vacuum adsorption pad 54*d* capable of vacuum-adsorbing or desorbing the second electrode members E2 to grip or release the second electrode members E2.

As shown in FIG. 16, the second electrode feeder 54 may be operated in such a manner that, when a second alignment plate 56*a* of the second electrode aligner 56 to be described later is stopped after being rotated by a predetermined angle, the third vacuum adsorption pads 54*d* of any one of second feeding arms 54*a* and 54*b* grip the second electrode member E2 from any one of the second load trays 52*a* and 52*b*, and at the same time, the other one of the second feeding arms 54*a* and 54*b* releases the second electrode member E2 previously gripped from the other one of the second load trays 52*a* and 52*b* so that the second electrode member E2 is seated on any one of second alignment members 56*b* of the second electrode aligner 56. The second electrode feeder 54 may alternately feed the second electrode member E2 disposed such that the negative electrode tab E6 is eccentric to any one side with respect to the center of the one end E5 of the second electrode member E2 and the second electrode member E2 disposed such that the negative electrode tab E6 is eccentric to the other side with respect to the center of the one end E5 of the second electrode member E2 to the second electrode aligner 56.

As shown in FIG. 16, the second electrode aligner 56 is installed so as to be positioned between the second electrode feeder 54 and the separator spiral H. As shown in FIG. 16, the second electrode aligner 56 may include the second alignment plate 56*a* that repeatedly performs an operation of rotating around a rotation shaft 56*j* by a predetermined rotation angle spacing and then stopping for a predetermined time period and second alignment members 56*b* that are radially installed on the second alignment plate 56*a* so as to be spaced apart from each other by the rotation angle spacing with respect to the rotation shaft 56*j* and that align the second electrode members E2 in a predetermined arrangement.

The second alignment plate 56*a* has a turntable structure and repeatedly performs an operation of rotating around the rotation shaft 56*j* axially coupled to a driving motor (not shown) by the rotation angle spacing and then stopping for a predetermined time period. The length of the rotation angle spacing is not particularly limited. For example, the second alignment plate 56*a* may repeatedly perform an operation of rotating by 90° and then stopping.

The second alignment members 56*b* are radially installed on the second alignment plate 56*a* so as to be spaced apart from each other by the same angle spacing as the rotation angle spacing of the second alignment plate 56*a*. For example, as shown in FIG. 16, when the rotation angle spacing of the second alignment plate 56*a* is 90°, the four second alignment members 56*b* may be radially disposed on the second alignment plate 56*a* so as to be spaced apart from each other by 90°.

The second electrode sensor 58 may be installed between the second electrode feeder 54 and the second electrode lamination unit 60 so as to be spaced apart from each of the second electrode feeder 54 and the second electrode lamination unit 60 by an integer multiple of the rotation angle spacing of the second alignment plate 56*a* with respect to the rotation shaft 56*j* of the second alignment plate 56*a*, and may be constituted by a two-piece detection sensor capable of detecting whether the two or more second electrode members E2 are seated on the second alignment members 56*b*. As shown in FIG. 16, when the second electrode feeder 54 and the second electrode lamination unit 60 are spaced apart from each other by 180° with respect to the rotation shaft 56*j* of the second alignment plate 56*a*, the second electrode sensor 58 may be installed between the second electrode feeder 54 and the second electrode lamination unit 60 so as to be spaced apart from each of the second electrode feeder 54 and the second electrode lamination unit 60 by 90°.

Next, the second electrode lamination unit 60 is a member for laminating the second electrode members E2 fed from the second electrode feeding unit 50 on the other surface of the separator spiral H.

As shown in FIG. 16, the second electrode lamination unit 60 is installed so as to be spaced apart from the second electrode feeder 54 by an integer multiple (e.g., 180°) of the rotation angle spacing of the second alignment plate 56a with respect to the rotation shaft 56j of the second alignment plate 56a. As shown in FIG. 19, the second electrode lamination unit 60 may include a second lamination plate 62 that repeatedly performs an operation of rotating around a rotation shaft 62a by a predetermined rotation angle spacing and then stopping for a predetermined time period, and a plurality of second electrode laminators 64 radially installed on the second lamination plate 62 so as to be spaced apart from each other by the same angle spacing as the rotation angle spacing of the second lamination plate 62 with respect to the rotation shaft 62a of the second lamination plate 62 and capable of laminating the second electrode members E2 seated on the second alignment members 56b on the other surface of the separator spiral H.

The second lamination plate 62 has a turntable structure and repeatedly performs an operation of rotating around the rotation shaft 62a axially coupled to a driving motor (not shown) by the rotation angle spacing and then stopping for a predetermined time period. The length of the rotation angle spacing of the second lamination plate 62 is not particularly limited. For example, the second lamination plate 62 may repeatedly perform an operation of rotating by 90° and then stopping. In addition, the second lamination plate 62 preferably has a driving period identical to that of the second alignment plate 56a of the second electrode aligner 56 described above. That is, the second lamination plate 62 is driven to rotate and stop simultaneously with the second alignment plate 56a.

The second electrode laminators 64 are radially installed on the second lamination plate 62 so as to be spaced apart from each other by the same angle spacing as the rotation angle spacing of the second lamination plate 62. For example, when the rotation angle spacing of the second lamination plate 62 is 90°, the four second electrode laminators 64 may be spaced apart from each other by 90°.

As shown in FIG. 19, the second electrode laminators 64 may include at least one fourth vacuum adsorption pad 64a capable of vacuum-adsorbing or desorbing the second electrode members E2 seated on the second alignment members 56b and a fourth conveying member 64b capable of reciprocating the fourth vacuum adsorption pads 64a so that the fourth vacuum adsorption pads 64a are brought close to or moved away from the rotation shaft 62a of the second lamination plate 62.

As shown in FIG. 19, the fourth conveying member 64b may include a cylinder 64c capable of reciprocating a cylinder rod 64e so that the cylinder rod 64e is brought close to or moved away from the rotation shaft 62a of the second lamination plate 62 and a guide member 64d coupled to the cylinder rod 64e so as to be reciprocated with the cylinder rod 64e. In addition, the fourth vacuum adsorption pads 64a are fixed to one end of the guide member 64d. This configuration allows the fourth conveying member 64b to reciprocate the fourth vacuum adsorption pads 64a so that the fourth vacuum adsorption pads 64a are brought close to or moved away from the rotation shaft 62a of the second lamination plate 62. In addition, the fourth conveying member 64b may include any one of various driving members capable of translational movement instead of the above-described cylinder 64c.

As shown in FIGS. 16 and 19, the second electrode lamination unit 60 operates in such a manner that, when the second alignment plate 56a and the second lamination plate 62 are rotated by a predetermined rotation angle, respectively, and then stopped at the same time, the fourth vacuum adsorption pads 64a of any one of the second electrode laminators 64 are moved toward the second alignment members 56b facing the fourth vacuum adsorption pads 64a and then the fourth vacuum adsorption pads 64a grip the second electrode member E2, and at the same time, the fourth vacuum adsorption pads 64a of the other one of the second electrode laminators 64 are moved toward the other surface of the separator spiral H facing the fourth vacuum adsorption pads 64a and then the fourth vacuum adsorption pads 64a press the second electrode member E2, which has been gripped in advance, against the other surface of the separator spiral H.

In addition, the second electrode lamination unit 60 is driven in such a manner that, when the folding jigs 22 described above grip the separator spiral H and the second electrode member E2 pressed against the separator spiral H by the other one of the second electrode laminators 64 in a state wherein the second electrode member E2 is press against on the other surface of the separator spiral H by the other one of the second electrode laminators 64, the fourth vacuum adsorption pads 64a of the other one of the second electrode laminators 64 release the second electrode member E2. Then, the second electrode member E2 released from the fourth vacuum adsorption pads 64a while being gripped by the folding jigs 22 is covered with the newly wound separator strip F on the separator spiral H when the folding jigs 22 are rotated in an inverted manner, and as a result, the second electrode members E2 are interposed between two neighboring layers of the separator spiral H.

When the electrode feeding units 30 and 50 and the electrode lamination units 40 and 60 are used, the first electrode members E1 composed of a positive electrode and the second electrode members E2 composed of a negative electrode are fed and laminated so that the positions of the positive and negative electrode tabs E4 and E6 are alternately inverted, respectively. Therefore, in the apparatus for manufacturing an electrode assembly 1, each time the electrode members E1 and E2 are newly laminated, even when the separator spiral H and the electrode members E1 and E2 laminated on the separator spiral H are rotated in an inverted manner by the separator folding unit 20 described above, the electrode assembly A in which the positive electrode tabs E4 are aligned in one line and the negative electrode tabs E6 are aligned in one line may be automatically manufactured, thereby further reducing the manufacturing time of the electrode assembly A.

In this specification, by operation of the apparatus for manufacturing an electrode assembly 1, the first electrode members E1 composed of a positive electrode which is a unit substance and the second electrode members E2 composed of a negative electrode which is a unit substance are laminated on the separator spiral H to manufacture the electrode assembly A. But the present invention is not limited thereto. For example, the first electrode member E1 may be a first unit cell (not shown) on which a positive electrode, a separator, and a negative electrode are laminated so that any one of the positive and negative electrodes is laminated on both outermost layers thereof, and the second electrode member E2 may be a second unit cell (not shown) on which a positive electrode, a separator, and a negative electrode are laminated so that the other one of positive and negative electrodes is laminated on both outermost layers thereof. In this case, the separator is a unit substance formed by cutting a separator strip so as to have an area corresponding to positive and negative electrodes. The separator is preferably made of the same material as the separator strip F described above, without being limited thereto.

Figure 20:
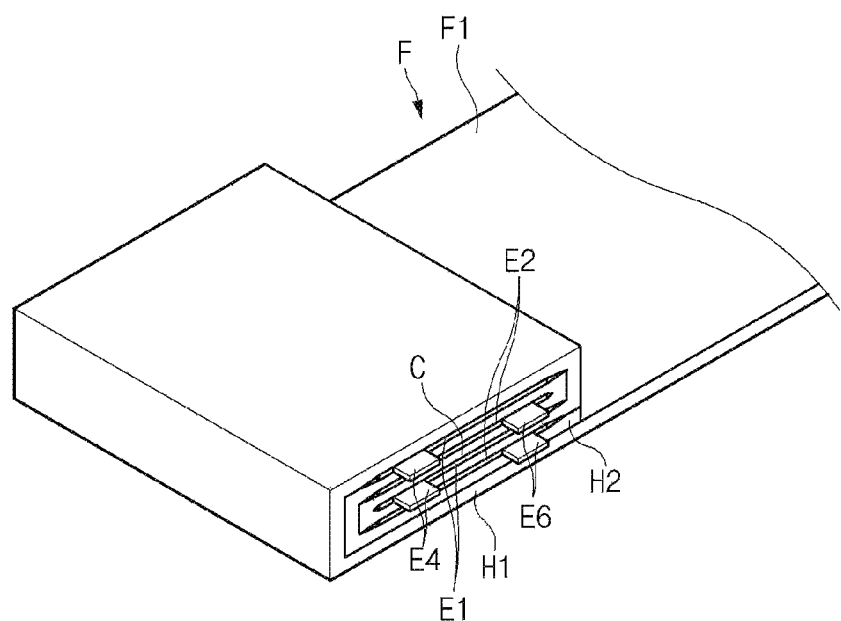
FIG. 20 is a perspective view of an electrode assembly manufactured by winding a separator strip and laminating electrode members using the apparatus for manufacturing an electrode assembly illustrated in FIG. 1.
Figure 21:
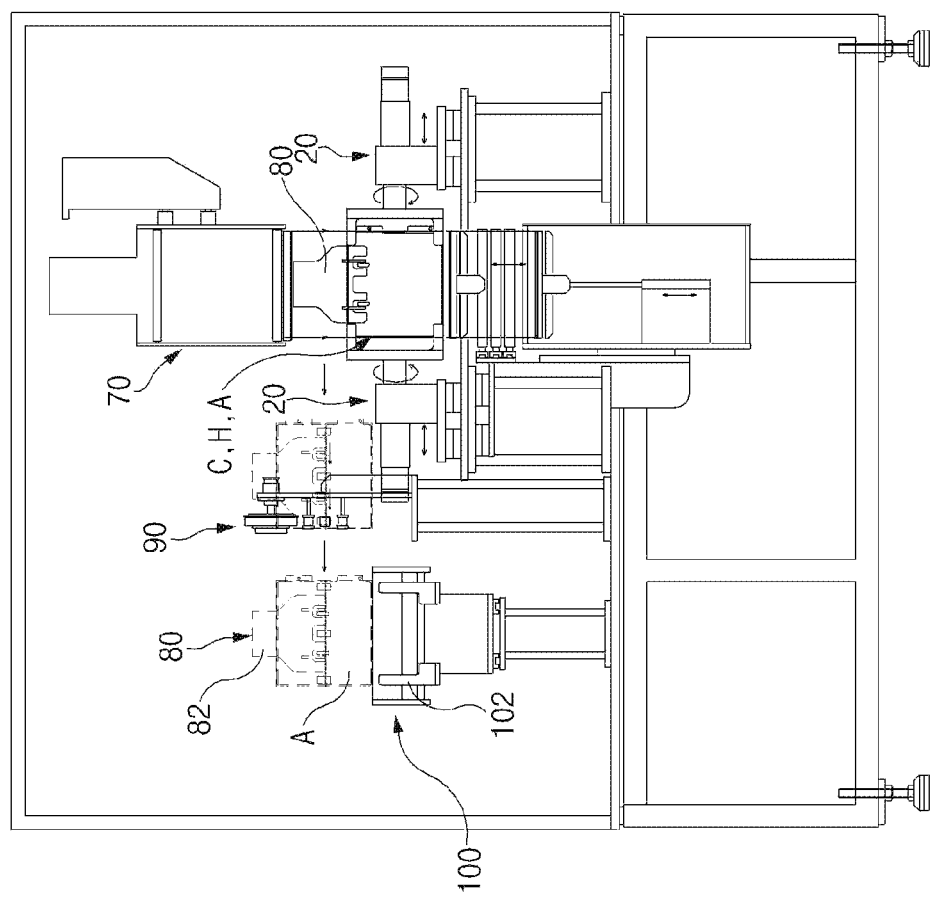
FIG. 21 is a side view of the apparatus for manufacturing an electrode assembly illustrated in FIG. 1, showing the positional relationship between a cutting unit and an assembly conveying unit.
Figure 22:
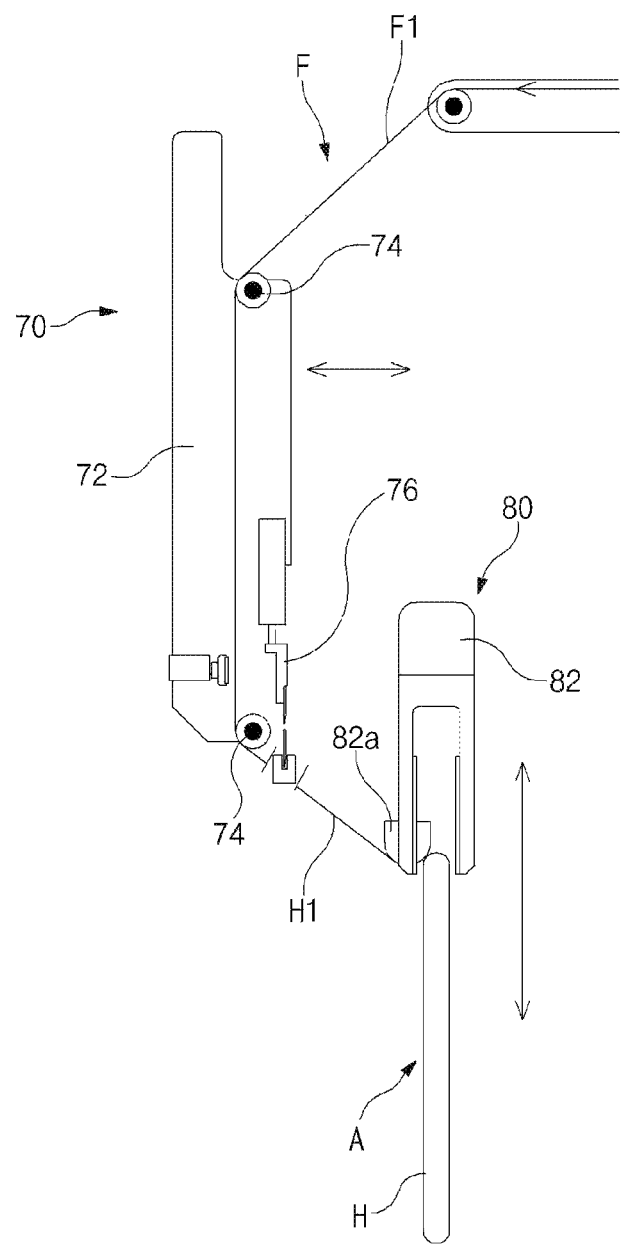
FIG. 22 is a drawing for explaining a manner in which the connection point between a separator spiral and a separator strip is cut by the cutting unit illustrated in FIG. 21.

FIG. 20 is a perspective view of an electrode assembly manufactured by winding a separator strip and laminating electrode members using the apparatus for manufacturing an electrode assembly illustrated in FIG. 1, FIG. 21 is a side view of the apparatus for manufacturing an electrode assembly illustrated in FIG. 1, showing the positional relationship between a cutting unit and an assembly conveying unit, and FIG. 22 is a drawing for explaining a manner in which the connection point between a separator spiral and a separator strip is cut by the cutting unit illustrated in FIG. 21.

Figure 23:
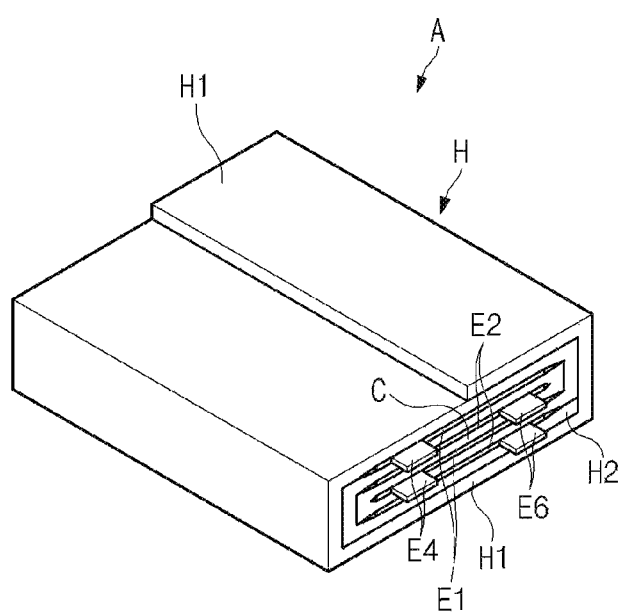
FIG. 23 is a perspective view of an electrode assembly separated from a separator strip by the cutting unit illustrated in FIG. 21.
Figure 24:
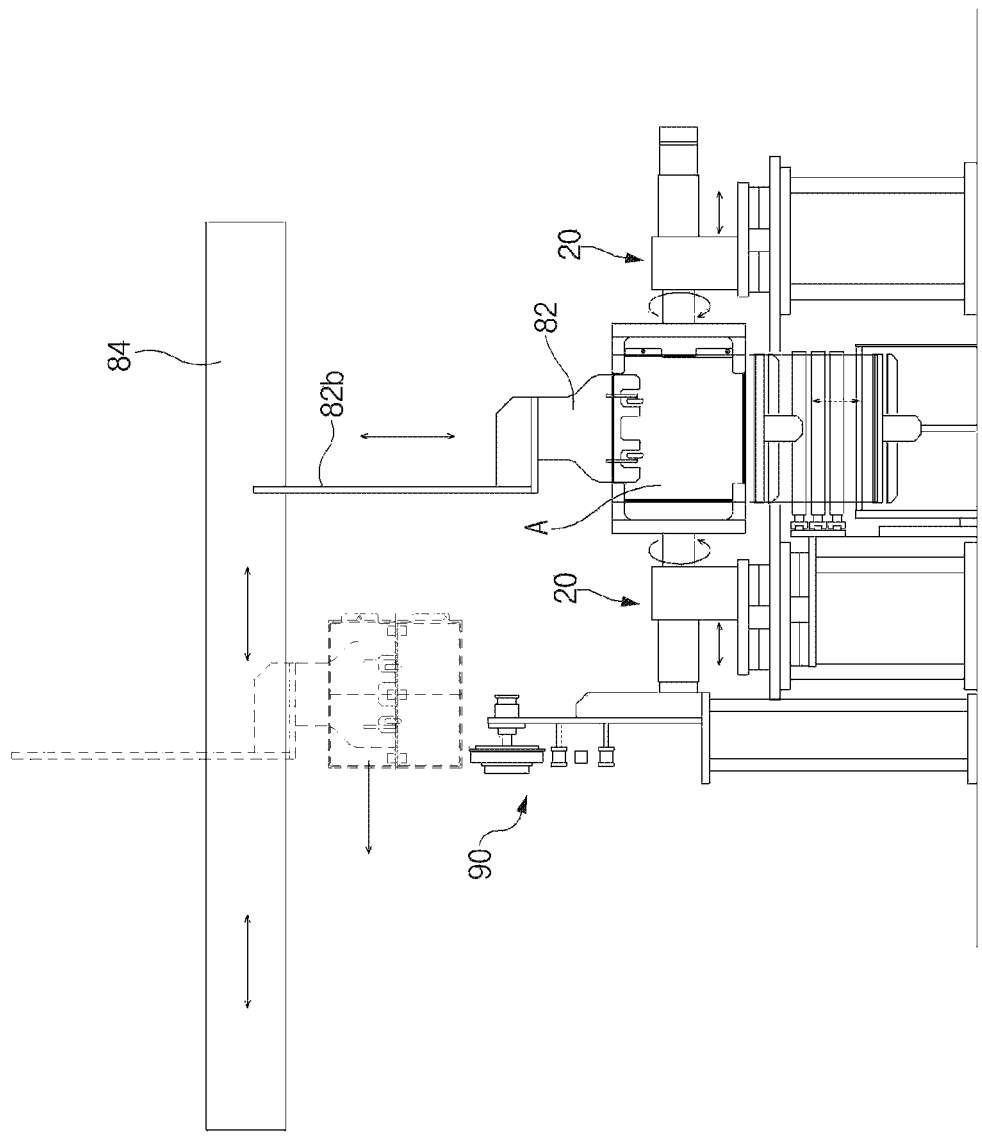
FIG. 24 is a drawing showing operation of the assembly conveying unit illustrated in FIG. 21.
Figure 25:
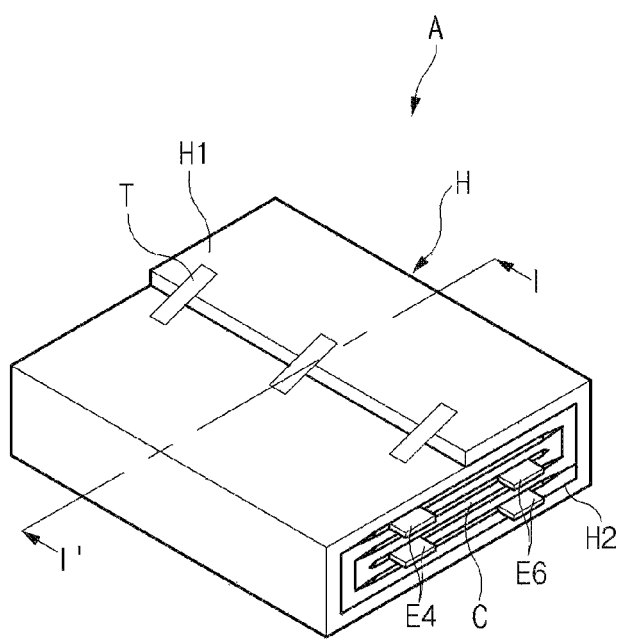
FIG. 25 is a perspective view of an electrode assembly in which a separator spiral is fixed by the taping unit illustrated in FIG. 21.

FIG. 23 is a perspective view of an electrode assembly separated from a separator strip by the cutting unit illustrated in FIG. 21, FIG. 24 is a drawing showing operation of the assembly conveying unit illustrated in FIG. 21, and FIG. 25 is a perspective view of an electrode assembly in which a separator spiral is fixed by the taping unit illustrated in FIG. 21.

As shown in FIG. 20, in the electrode assembly A in which the separator strip F is wound and the first and second electrode members E1 and E2 are laminated, the separator strip F1 fed from the first roll 11 and the first spiral part H1 are connected to each other. Therefore, to complete manufacture of the electrode assembly A, operation of cutting one end of the first spiral part H1 connected to the separator strip F1 fed from the first roll 11 and operation of fixing one end of the first spiral part H1 released from the separator strip F1 are additionally required.

To solve this problem, the apparatus for manufacturing an electrode assembly 1, As shown in FIG. 21, further includes the cutting unit 70 for cutting the separator strip F1 fed from the first roll 11, an assembly conveying unit 80 capable of conveying the electrode assembly A along a predetermined path, a taping unit 90 for fixing the separator spiral H of the electrode assembly A with a tape, and a loading unit 100 in which the electrode assembly A having the taped separator spiral H is loaded.

First, the cutting unit 70 is a device for cutting the separator strip F1 fed from the first roll 11.

The cutting unit 70 is installed between the electrode assembly A and the first roll 11. As shown in FIG. 22, the cutting unit 70 includes a main body 72 provided to be reciprocatable in a horizontal direction so as to be moved away from or close to the electrode assembly A, at least one guide roller 74 for guiding the separator strip F1 fed from the first roll 11 toward the main body 72, and a cutter 76 capable of cutting the separator strip F1 fed from the first roll 11.

As shown in FIG. 22, the main body 72 is installed between the electrode assembly A and the first roll 11. The main body 72 is coupled to a driving member (not shown) and may be reciprocated in the horizontal direction so as to be moved away from or close to the electrode assembly A.

As shown in FIG. 22, the guide rollers 74 are installed on one surface of the main body 72 so that the separator strip F1 fed from the first roll 11 passes between the main body 72 and the guide rollers 74. As shown in FIG. 22, when the main body 72 is moved away from the electrode assembly A, the separator strip F1 fed from the first roll 11 and one end of the first spiral part H1 connected to the separator strip F1 are guided toward the main body 72 by the first the guide rollers 74 and pulled away from the electrode assembly A.

As a result, a predetermined tension may be applied to the connection point between the separator strip F1 fed from the first roll 11 and one end of the first spiral part H1, and at the same time, a space necessary for the assembly conveying unit 80 to be described later to grip the electrode assembly A may be formed between the cutting unit 70 and the electrode assembly A.

As shown in FIG. 22, the cutter 76 is installed on one surface of the main body 72 so that, when the separator strip F1 fed from the first roll 11 and one end of the first spiral part H1 are moved away from the electrode assembly A by the main body 72, the cutter 76 faces the separator strip F1 fed from the first roll 11. The cutter 76 may be moved toward the separator strip F1 fed from the first roll 11 and may cut the connection point between the separator strip F1 fed from the first roll 11 and one end of the first spiral part H1. As described above, the first and second rolls 11 and 12 respectively feed the separator strip F having a predetermined length so that the first spiral part H1 extends longer than the second spiral part H2. Therefore, as shown in FIG. 23, the first spiral part H1 is disconnected from the separator strip F1 fed from the first roll 11 while being extended longer than the second spiral part H2. As a result, the electrode assembly A is formed such that one end of the second spiral part H2 is covered with the first spiral part H1.

Next, the assembly conveying unit 80 is a device for transferring the electrode assembly A along a predetermined path so that taping and loading operation may be performed.

As shown in FIG. 21, the assembly conveying unit 80 is provided to be reciprocally movable between the separator folding unit 20 and the loading unit 100 so that the electrode assembly A separated from the separator strip F1 fed from the first roll 11 by the cutting unit 70 is transferred to the taping unit 90 and the loading unit 100. The assembly conveying unit 80 may include a conveying jig 82 capable of gripping and releasing the electrode assembly A and a fifth conveying member 84 capable of conveying the conveying jig 82 along a predetermined path.

The conveying jig 82 has a clamp structure capable of gripping or releasing the electrode assembly A. As shown in FIG. 22, the conveying jig 82 may be equipped with the pressure roller 82a capable of pressing one end of the first spiral part H1 pulled away from the electrode assembly A along the separator strip F1.

As shown in FIG. 24, the fifth conveying member 84 is installed between the separator folding unit 20 and the loading unit 100. The fifth conveying member 84 is coupled to the conveying jig 82 through a connection bar 82b so that the conveying jig 82 may be reciprocally conveyed in the vertical and horizontal directions, respectively.

As shown in FIG. 22, when the main body 72 of the cutting unit 70 is moved away from the electrode assembly A, the conveying jig 82 is moved toward the electrode assembly A by the fifth conveying member 84 so that the conveying jig 82 is moved to a space formed by movement of the main body 72 of the cutting unit 70. At this time, as shown in FIG. 22, the conveying jig 82 is moved toward the electrode assembly A so as to form pressing contact with one end of the first spiral part H1 pulled toward the cutting unit 70 so that predetermined tension may be applied to the first spiral part H1. Then, the cutting unit 70 may easily cut one end of the first spiral part H1 in a tense state.

In addition, as shown in FIG. 24, when the cutter 76 of the cutting unit 70 cuts the connection point between the separator strip F and one end of the first spiral part H1, the conveying jig 82 may move further deeper toward the electrode assembly A and grip the electrode assembly A.

In addition, as shown in FIG. 24, the conveying jig 82 may be moved to the loading unit 100 via the taping unit 90 and then may transfer the electrode assembly A to a seating member 102 of the loading unit 100.

Next, the taping unit 90 is a device for fixing the separator spiral H separated from the separator strip F.

As shown in FIG. 21, the taping unit 90 is installed between the separator folding unit 20 and the loading unit 100 so that the electrode assembly A moving in a state of being gripped by the conveying jig 82 toward the loading unit 100 may pass therethrough. As shown in FIG. 25, by operation of the taping unit 90, tape T may be attached to one end of the first spiral part H1 in the free end state after being separated from the separator strip F, and the taped one end may be fixed to the outer surface of the separator spiral H. As a result, the first spiral part H1 is fixed in a state surrounding one end of the second spiral part H2, so that the lamination state of the separator spiral H and the electrode members E1 and E2 may be more stably maintained.

Next, the loading unit 100 is a device for loading and storing the completed electrode assembly A.

As shown in FIGS. 16 and 21, the loading unit 100 is installed in such a manner that the electrode assembly A that has passed through the taping unit 90 may enter. The loading unit 100 includes the seating member 102 for seating the electrode assembly A received from the conveying jig 82 that has passed through the taping unit 90 onto a conveyor belt 104 and the conveyor belt 104 for conveying the electrode assembly A seated by the seating member 102 and loading the electrode assembly A on a loading box (not shown).

Figure 26:
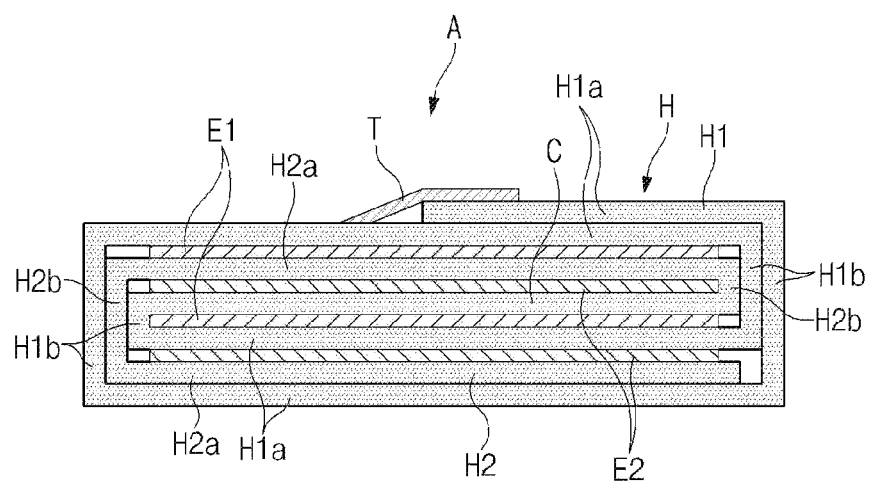
FIG. 26 is a cross-sectional view taken along line I-I' of the electrode assembly illustrated in FIG. 25.

FIG. 26 is a cross-sectional view taken along line I-I' of the electrode assembly illustrated in FIG. 25.

Referring to FIG. 26, the electrode assembly A manufactured using the apparatus for manufacturing an electrode assembly 1 includes the separator spiral H folded in a spiral shape and the electrode members E1 and E2 interposed between two neighboring layers of the separator spiral H.

First, the separator spiral H includes the core portion C, the first spiral part H1 having one end connected to one end of the core portion C and folded in a spiral shape around the core portion C, and the second spiral part H2 having one end connected to the other end of the core portion C opposite to the one end of the core portion C and folded in a spiral shape around the core portion C. In particular, the first and second spiral parts H1 and H2 extend parallel to each other in the same spiral direction and form a double spiral structure in which at least some sections face each other.

As shown in FIG. 26, the core portion C has a flat-plate shape having a predetermined area and is positioned at the center of the separator spiral H.

The first spiral part H1 includes a plurality of first interposing portions H1a provided parallel to the core portion C and a plurality of first connection portions H1b for connecting the first interposing portion H1a of the lowermost layer close to the core portion among the first interposing portions H1a to the core portion C or connecting a pair of the first interposing portions H1a adjacent to each other among the first interposing portions H1a to each other.

The first interposing portions H1a have a flat-plate shape having a predetermined area and are provided in parallel with the core portion C. The first connection portions H1b are provided at a predetermined angle with respect to the core portion C and the first interposing portions H1a so that the first spiral part H1 is folded in a spiral shape.

The cross-sectional area of the electrode assembly A is increased in proportion to increase in the cumulative length of the wound separator strip F and the cumulative number of the laminated electrode members E1 and E2. Correspondingly, the length of each of the first interposing portions H1a and the length of each of the first connection portions H1b become longer from the core portion C to the outer periphery of the electrode assembly A.

In addition, the first spiral part H1 extends longer than the second spiral part H2 so as to cover the other end of the second spiral part H2 opposite to one end of the second spiral part H2 connected to one end of the core portion C. For example, as shown in FIG. 26, the first spiral part H1 extends longer than the second spiral part H2 so that the second interposing portion H2a located at the outermost of the electrode assembly A among second interposing portions H2a is covered with the first interposing portion H1a. However, the present invention is not limited thereto, and the second spiral part H2 may extend longer than the first spiral part H1.

The second spiral part H2 includes the second interposing portions H2a provided parallel to the core portion C and a plurality of second connection portions H2b for connecting the second interposing portion H2a of the lowermost layer close to the core portion C among the second interposing portions H2a to the core portion C or connecting the second interposing portions H2a adjacent to each other among the second interposing portions H2a to each other.

The second interposing portions H2a have a flat-plate shape having a predetermined area and are provided in parallel with the core portion C. The second connection portions H2b are provided at a predetermined angle with respect to the core portion C and the second interposing portions H2a so that the second spiral part H2 is folded in a spiral shape.

In addition, to form the above-described double-spiral structure, the first and second spiral parts H1 and H2 are provided in such a manner that at least one of the first interposing portions H1a faces at least one of the second interposing portions H2a, and at least one of the first connection portions H1b faces at least one of the second connection portions H2b.

Next, the electrode members E1 and E2 are provided with at least one first electrode member E1 and at least one second electrode member E2 that have opposite polarities and are alternately interposed between two neighboring layers of the separator spiral H so as to be spaced apart from each other by the separator spiral H.

The first and second electrode members E1 and E2 are alternately interposed between the first interposing portion H1a of the lowermost layer close to the core portion and the core portion C, between the second interposing portion H2a of the lowermost layer close to the core portion C and the core portion C, and between the first interposing portion H1a and the second interposing portion H2a adjacent to each other.

As shown in FIG. 25, each of the first electrode members E1 is provided with the positive electrode tab E4 that is provided at the one end E3 of each of the first electrode members E1 and protrudes outside of the electrode assembly A through the gap between two neighboring layers of the separator spiral H. Correspondingly, as shown in FIG. 25, each of the second electrode members E2 is provided with the negative electrode tab E6 that is provided at the one end E5 of each of the second electrode members E2 and protrudes outside of the electrode assembly A through the gap between two neighboring layers of the separator spiral H. As shown in FIG. 25, the first and second electrode members E1 and E2 are preferably disposed in such a manner that the positive and negative electrode tabs E4 and E6 are positioned at the same side end portion of the electrode assembly A.

As shown in FIG. 25, the positive electrode tab E4 may be provided at a position spaced from the center of the one end E3 of the first electrode member E1 by a predetermined distance, and the negative electrode tab E6 may be provided at a position spaced from the center of the one end E5 of the second electrode member E2 by a predetermined distance. In this case, as shown in FIG. 25, the first and second electrode members E1 and E2 are preferably disposed so that the positive electrode tabs E4 are aligned in one line and the negative electrode tabs E6 are aligned in one line.

The electrode assembly A has a structure in which the first electrode members E1 composed of a positive electrode which is a unit substance and the second electrode members E2 composed of a negative electrode which is a unit substance are alternately interposed between two neighboring layers of the separator spiral H. Therefore, compared to a conventional stack/folding type electrode assembly in which full cells having a structure of positive electrode/separator/negative electrode or bicells having a structure of positive electrode/(negative electrode)/separator/negative electrode (positive electrode)/separator/positive electrode(negative electrode) are laminated, in the case of the electrode assembly A, the manufacturing process of full cells or bicells may be omitted, the arrangement of the electrode members E1 and E2 is simple, and the electrode assembly A has a compact structure. Therefore, the manufacturing time of the electrode assembly A may be reduced, thereby improving productivity. In addition, the manufacturing process of the electrode assembly A may be easily automated, and occurrence of defects due to carelessness or errors easily caused during the manufacturing process may be minimized, thereby improving the quality of the electrode assembly A and a secondary battery manufactured using the electrode assembly A.

Figure 27:
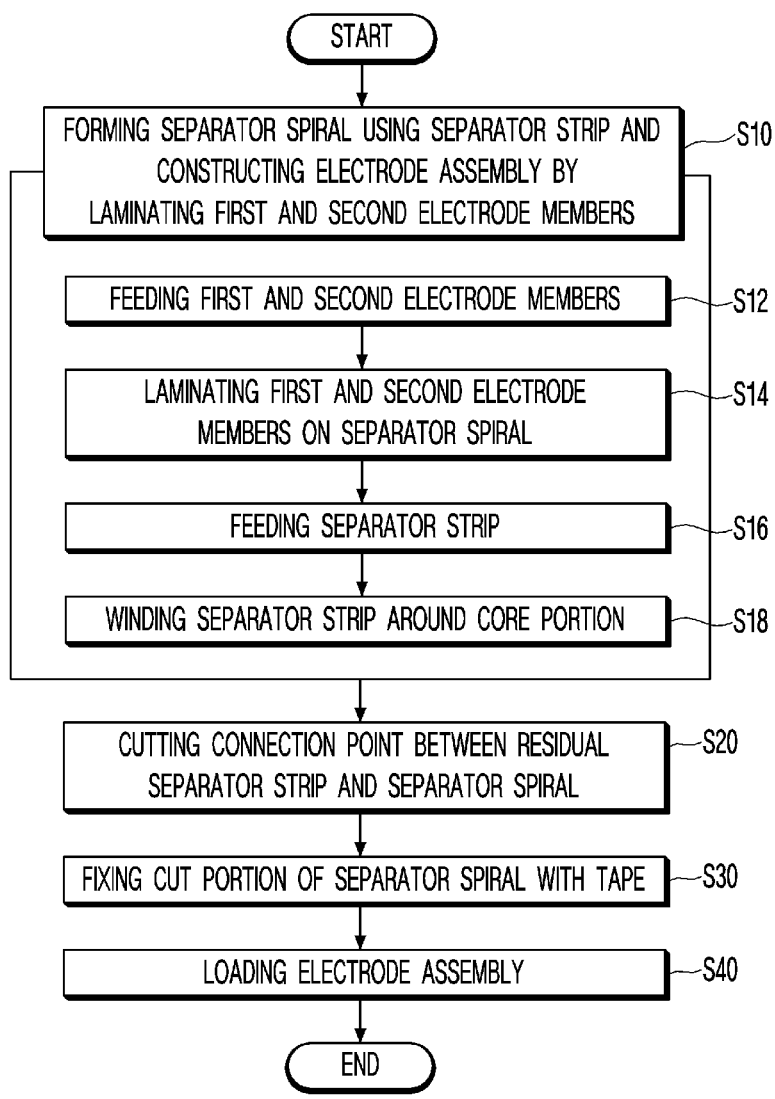
FIG. 27 is a flowchart for explaining a method of manufacturing an electrode assembly using the apparatus for manufacturing an electrode assembly illustrated in FIG. 1.

FIG. 27 is a flowchart for explaining a method of manufacturing an electrode assembly using the apparatus for manufacturing an electrode assembly illustrated in FIG. 1.

Hereinafter, referring to FIG. 27, a method of manufacturing an electrode assembly according to another preferred embodiment of the present invention using the apparatus for manufacturing an electrode assembly 1 described above will be described.

Referring to FIG. 27, a method of manufacturing an electrode assembly according to another preferred embodiment of the present invention includes step S10, in which the separator strip F elongated in a strip shape is wound around the core portion C provided between one side and the other side of the separator strip F so that the separator strip F is folded in a spiral shape, and as a result, the number of the spiral layers having the core portion C as a minimum unit is increased stepwise to form the separator spiral H, and at the same time, the first and second electrode members E1 and E2 are alternately interposed between two neighboring layers of the separator spiral H to construct the electrode assembly A, step S20 of separating the separator spiral H and the residual separator strip F1 not wound on the separator spiral H1 in step S10 by cutting the connection point between the residual separator strip F and the separator spiral H, step S30 of fixing the cut portion of the separator spiral H cut in step S20 using a tape, and step S40 of loading the electrode assembly A subjected to taping treatment in step S30 in a predetermined loading position.

First, as shown in FIG. 27, step S10 includes step S14 of laminating the first electrode members E1 on one surface of the separator spiral H and laminating the second electrode members E2 on the other surface of the separator spiral H; and step S18, in which the separator strip F is wound around the core portion C so as to be folded in a spiral shape, and as a result, the newly laminated first and second electrode members E1 and E2 in step S14 are covered with the newly wound separator strip F on the separator spiral H. Steps S14 and S18 are repeatedly performed until the first and second electrode members E1 and E2 are laminated on the separator spiral H in a predetermined number, respectively.

In addition, in step S14, before step S18 is performed for the first time, the first electrode member E1 is laminated on one surface of the core portion C and the second electrode member E2 is laminated on the other surface of the core portion C, and after step S18 is performed for the first time, the first electrode members E1 are laminated on one outermost surface of the separator spiral H and the second electrode members E2 are laminated on the other outermost surface of the separator spiral H.

However, when the separator strip F is rotated in an inverted manner around the core portion C as in step S18, the separator strip F is pulled toward the core portion C from both the one side and the other side and wound around the core portion C to be folded in a spiral shape to form the separator spiral H. The separator spiral H includes the first spiral part H1 connected to one end of the core portion C and formed by spirally folding the separator strip F fed from one side of the separator strip F and the second spiral part H2 connected to the other end of the core portion C and formed by spirally folding the separator strip F fed from the other side of the separator strip F.

Considering that the separator strip F is pulled toward the core portion C to form the separator spiral H including the first and second spiral parts H1 and H2, as shown in FIG. 27, step S10 further includes step S16 of feeding the separator strip F from both the one side and the other side toward the core portion C, wherein step S16 is performed between steps S14 and S18 or simultaneously performed with step S18.

As in steps S14 and S18, step S16 is repeatedly performed until the first and second electrode members E1 and E2 are laminated on the separator spiral H in a predetermined number, respectively.

In addition, in step S16, corresponding to increase in the cross-sectional area of the electrode assembly A in accordance with increase in the cumulative length of the wound separator strip F and the cumulative number of the laminated first and second electrode members E1 and E2, each time step S16 is repeatedly performed, the feeding length of the separator strip F is increased stepwise.

In addition, in step S16, the separator strip F having a predetermined length is fed from both directions toward the core portion C so that when the separator strip F is newly wound on the separator spiral H to cover the last first and second electrode members E1 and E2 in step S18 after the last first and second electrode members E1 and E2 are laminated on the separator spiral H in step S14, the first spiral part H1 extends longer than the second spiral part H2 and as a result, covers one end of the second spiral part H2.

Next, in step S20, the separator spiral H and the residual separator strip F1 not wound on the separator spiral H1 in the separator strip F fed from one side of the separator strip F are separated by cutting a connection point between the residual separator strip F1 and one end of the first spiral part H1. As a result, the first spiral part H1 extends longer than the second spiral part H2 so that one end of the second spiral part H2 is covered with the first spiral part H1.

Thereafter, step S30 of fixing one end of the first spiral part H1 cut in step S20 to the outside surface of the separator spiral H using the tape T is performed. Then, the separator spiral H of the electrode assembly A is tightly fixed while covering the first and second electrode members E1 and E2 alternately interposed between two neighboring layers of the separator spiral H.

Next, step S40 of loading the electrode assembly A having taped one end of the first spiral part H1 in step S30 in a predetermined loading position is performed.

In addition, the first electrode members E1 may be composed of a positive electrode which is a unit substance provided with the positive electrode tab E4, and the second electrode members E2 may be composed of a negative electrode which is a unit substance provided with the negative electrode tab E6.

Correspondingly, in step S14, the first and second electrode members E1 and E2 are laminated on the separator spiral H in such a manner that the positive and negative electrode tabs E4 and E6 protrude outwardly through the gaps between two neighboring layers of the separator spiral H, respectively.

In addition, the positive electrode tab E4 may be provided at the one end E3 of the first electrode member E1. In this case, the positive electrode tab E4 may be provided at a position spaced from the center of the one end E3 of the first electrode member E1 by a predetermined distance. The negative electrode tab E6 may be provided at the one end E5 of the second electrode member E2. In this case, the negative electrode tab E6 may be provided at a position spaced from the center of the one end E5 of the second electrode member E2 by a predetermined distance.

Correspondingly, step S10 may further include step S12 of alternately feeding the first electrode members E1 disposed such that the positive electrode tabs E4 are eccentric to any one side with respect to the center of the one end E3 of the first electrode member E1 and the first electrode members E1 disposed such that the positive electrode tabs E4 are eccentric to the other side with respect to the center of the one end E3 of the first electrode member E1, and at the same time, alternately feeding the second electrode members E2 disposed such that the negative electrode tabs E6 are eccentric to any one side with respect to the center of the one end E5 of the second electrode member E2 and the second electrode members E2 disposed such that the negative electrode tabs E6 are eccentric to the other side with respect to the center of the one end E5 of the second electrode member E2 before step S14 is performed.

In step S12, the first electrode members E1 are alternately transferred from a pair of the first load trays 32a and 32b on which the first electrode members E1 loaded symmetrically so that the positive electrode tabs E4 are eccentric in different directions with respect to the center of the one end E3 of the first electrode member E1, and then the transferred first electrode members E1 are fed, and at the same time, the second electrode members E2 are alternately transferred from a pair of the second load trays 52a and 52b on which the second electrode members E2 loaded symmetrically so that the negative electrode tabs E6 are eccentric in different directions with respect to the center of the one end E5 of the second electrode member E2, and then the transferred second electrode members E2 are fed.

Then, in step S14, the first and second electrode members E1 and E2 in step S12 are respectively laminated on the separator spiral H in such a manner that the positive electrode tabs E4 are aligned in one line and the negative electrode tabs E6 are aligned in one line. In addition, in step S14, the positive and negative electrode tabs E4 and E6 may protrude outwardly through the same side end portion of the electrode assembly A.

Although the preferred embodiments of the present invention have been shown and described, the present invention is not limited to the specific embodiments described above. Those skilled in the art will appreciate that various modifications are possible, without departing from the scope and spirit of the invention as defined in the appended claims. In addition, these modifications should not be understood separately from the technical idea or viewpoint of the present invention.

The invention claimed is:

1. An apparatus for manufacturing an electrode assembly, comprising:
    a separator feeding unit comprising a first roll on which one side of a separator strip is wound and a second roll on which the other side of the separator strip is wound, wherein the first and second rolls respectively unwind the separator strip so that the separator strip is fed toward a core portion of the separator strip disposed between the first and second rolls;
    a separator folding unit for winding the separator strip around the core portion to form a separator spiral folded in a spiral shape about the core portion and comprising at least the core portion;
    a first electrode lamination unit for laminating first electrode members on one surface of the separator spiral;
    a second electrode lamination unit for laminating second electrode members on the other surface of the separator spiral;
    a first electrode feeding unit capable of feeding the first electrode members to the first electrode lamination unit; and
    a second electrode feeding unit capable of feeding the second electrode members to the second electrode lamination unit,
    wherein each time the first and second electrode members are newly laminated on the separator spiral, the separator folding unit winds the separator strip so that newly laminated first and second electrode members are covered with the separator strip, and as a result, the first and second electrode members are interposed between two neighboring layers of the separator spiral to form an electrode assembly, and
        wherein the first electrode lamination unit comprises a first lamination plate that repeatedly performs an operation of rotating around a rotation shaft by a predetermined rotation angle spacing and then stopping for a predetermined time period; and
        a plurality of first electrode laminators radially installed on the first lamination plate so as to be spaced apart from each other by the rotation angle spacing with respect to the rotation shaft of the first lamination plate and capable of lamination the first electrode members fed from the first electrode feeding unit on one surface of the separator spiral, and
        wherein the second electrode lamination unit comprises a second lamination plate that repeatedly performs an operation of rotating around a rotation shaft by a predetermined rotation angle spacing and then stopping for a predetermined time period; and
        a plurality of second electrode laminators radially installed on the second lamination plate so as to be spaced apart from each other by the rotation angle spacing with respect to the rotation shaft of the second lamination plate and capable of laminating the second electrode members fed from the second electrode feeding unit on the other surface of the separator spiral.

2. The apparatus according to claim 1, wherein each time the first and second electrode members are newly laminated on the separator spiral, the separator folding unit winds the separator strip so that the core portion is rotated in an inverted manner.

3. The apparatus according to claim 1, wherein the separator spiral comprises a first spiral part connected to one end of the core portion and formed by spirally folding a separator strip fed from the first roll; and
a second spiral part connected to the other end of the core portion and formed by spirally folding a separator strip fed from the second roll,
wherein, the other side of the separator strip is wound on the second roll by a predetermined length so that when the separator folding unit last winds the separator strip after last first and second electrode members are laminated on the separator spiral, the first spiral part extends longer than the second spiral part and as a result, covers one end of the second spiral part.

4. The apparatus according to claim 3, wherein the second roll comprises a winding jig capable of gripping or releasing the other end of the separator strip; and
a first conveying member capable of reciprocating the winding jig so as to draw the winding jig into an inside of the second roll or to push the winding jig out of the second roll,
wherein the winding jig grips the other end of the separator strip in a free-end state in an outside of the second roll, the winding jig enters an inside of the second roll, and then the winding jig is rotationally driven, so that the other side of the separator strip is wound by the predetermined length.

5. The apparatus according to claim 4, wherein the winding jig releases the other end of the separator strip at a predetermined time so that the other end of the separator strip is wound on the separator spiral around the core portion to form one end of the second spiral part.

6. The apparatus according to claim 3, further comprising:
a cutting unit installed between the core portion and the first roll and responsible for cutting a connection point between the separator strip and one end of the first spiral part.

7. The apparatus according to claim 6, further comprising:
an assembly conveying unit capable of conveying the electrode assembly along a predetermined conveying path; and
a taping unit installed on the conveying path and responsible for fixing one end of the first spiral part cut by the cutting unit with a tape.

8. The apparatus according to claim 7, wherein the cutting unit is movably provided so as to drag one end of the first spiral part from the electrode assembly by a predetermined distance, and
the cutting unit performs cutting operation after dragging one end of the first spiral part by the predetermined distance.

9. The apparatus according to claim 8, wherein the assembly conveying unit is provided so as to apply pressure to the first spiral part so that, when the cutting unit drags one end of the first spiral part by the predetermined distance, the assembly conveying unit moves toward the electrode assembly so that tension is applied to the one end of the first spiral part, and the assembly conveying unit is provided so that, when one end of the first spiral part is cut, the assembly conveying unit grips the electrode assembly and then conveys the electrode assembly along the conveying path.

10. The apparatus according to claim 1, wherein the first electrode feeding unit comprises first load trays on which the first electrode members are loaded; and a first electrode feeder for feeding the first electrode members from the first load trays to the first electrode lamination unit, and
the second electrode feeding unit comprises second load trays on which the second electrode members are loaded; and a second electrode feeder for feeding the second electrode members from the second load trays to the second electrode lamination unit.

11. The apparatus according to claim 10, wherein the first electrode feeding unit further comprises a first electrode aligner for aligning the first electrode members fed from the first electrode feeder in a predetermined arrangement and transferring the first electrode members to the first electrode lamination unit, and
the second electrode feeding unit further comprises a second electrode aligner for aligning the second electrode members fed from the second electrode feeder in a predetermined arrangement and transferring the second electrode members to the second electrode lamination unit.

12. The apparatus according to claim 11, wherein the first electrode aligner comprises a first alignment plate that repeatedly performs an operation of rotating around a rotation shaft by a predetermined rotation angle spacing and then stopping for a predetermined time period; and
a plurality of first alignment members that are radially installed on the first alignment plate so as to be spaced apart from each other by the rotation angle spacing with respect to the rotation shaft of the first alignment plate and that align the first electrode members in the arrangement, and
the second electrode aligner comprises a second alignment plate that repeatedly performs an operation of rotating around a rotation shaft by a predetermined rotation angle spacing and then stopping for a predetermined time period; and
a plurality of second alignment members that are radially installed on the second alignment plate so as to be spaced apart from each other by the rotation angle spacing with respect to the rotation shaft of the second alignment plate and that align the second electrode members in the arrangement.

13. The apparatus according to claim 12, wherein the first electrode feeder is provided so as to grip or release the first electrode members; and when the first alignment plate is rotated by the rotation angle spacing and then stopped, a first electrode member, which has been gripped in advance from the first load trays, is seated on any one of the first alignment members, and
the second electrode feeder is provided so as to grip or release the second electrode members; and when the second alignment plate is rotated by the rotation angle spacing and then stopped, a second electrode member, which has been gripped in advance from the second load trays, is seated on any one of the second alignment members.

14. The apparatus according to claim 13, wherein the first electrode lamination unit is installed so as to be spaced apart from the first electrode feeder by an integer multiple of the rotation angle spacing with respect to a rotation shaft of the first alignment plate; and when the first alignment plate is rotated by the rotation angle spacing and then stopped, the first electrode lamination unit receives a first electrode member seated on any one of the first alignment members, and the second electrode lamination unit is installed so as to be spaced apart from the second electrode feeder by an integer multiple of the rotation angle spacing with respect to a rotation shaft of the second alignment plate; and when the second alignment plate is rotated by the rotation angle spacing and then stopped, the second electrode lamination unit receives a second electrode member seated on any one of the second alignment members.

15. The apparatus according to claim 14, wherein the first electrode feeding unit further comprises a first electrode sensor that is installed between the first electrode feeder and the first electrode lamination unit so as to be spaced apart from each of the first electrode feeder and the first electrode lamination unit by an integer multiple of the rotation angle spacing with respect to a rotation shaft of the first alignment plate, and that is capable of detecting whether two or more first electrode members are seated on the first alignment members, and the second electrode feeding unit further comprises a second electrode sensor that is installed between the second electrode feeder and the second electrode lamination unit so as to be spaced apart from each of the second electrode feeder and the second electrode lamination unit by an integer multiple of the rotation angle spacing with respect to a rotation shaft of the second alignment plate, and that is capable of detecting whether two or more second electrode members are seated on the second alignment members.

16. The apparatus according to claim 1, wherein, when the first lamination plate is rotated by the rotation angle spacing and then stopped, any one of the first electrode laminators grips a first electrode member fed from the first electrode feeding unit, and the other one of the first electrode laminators laminates a first electrode member, which has been gripped in advance, on one surface of the separator spiral, and when the second lamination plate is rotated by the rotation angle spacing and then stopped, any one of the second electrode laminators grips a second electrode member fed from the second electrode feeding unit, and the other one of the second electrode laminators laminates a second electrode member, which has been gripped in advance, on the other surface of the separator spiral.

17. The apparatus according to claim 1, wherein the first electrode member is a positive electrode which is a unit substance, and the second electrode member is a negative electrode which is a unit substance.

18. The apparatus according to claim 1, wherein the first electrode member is a first unit cell on which a positive electrode, a separator, and a negative electrode are laminated so that any one of positive and negative electrodes is laminated on both outermost layers thereof, and the second electrode member is a second unit cell on which a positive electrode, a separator, and a negative electrode are laminated so that the other one of positive and negative electrodes is laminated on both outermost layers thereof.

* * * * *